(12) United States Patent
Hori

(10) Patent No.: US 8,704,890 B2
(45) Date of Patent: Apr. 22, 2014

(54) INSPECTION APPARATUS AND MEASURING METHOD

(75) Inventor: Fumio Hori, Tokyo (JP)

(73) Assignee: Olympus Corporation, Tokyo (JP)

( * ) Notice: Subject to any disclaimer, the term of this patent is extended or adjusted under 35 U.S.C. 154(b) by 763 days.

(21) Appl. No.: 12/859,579

(22) Filed: Aug. 19, 2010

(65) Prior Publication Data
US 2012/0044349 A1 Feb. 23, 2012

(51) Int. Cl.
*H04N 7/18* (2006.01)

(52) U.S. Cl.
USPC .............. 348/146; 348/65; 348/E07; 348/85

(58) Field of Classification Search
USPC .................................. 348/136, 128
See application file for complete search history.

(56) References Cited

U.S. PATENT DOCUMENTS

| | | | | |
|---|---|---|---|---|
| 4,412,121 A * | 10/1983 | Kremers et al. | ......... | 219/124.34 |
| 4,656,508 A * | 4/1987 | Yokota | ............. | 348/45 |
| 4,846,577 A * | 7/1989 | Grindon | ........... | 356/610 |
| 4,878,113 A * | 10/1989 | Nakamura | ............. | 348/71 |
| 4,980,763 A | 12/1990 | Lia | | |
| 4,986,262 A * | 1/1991 | Saito | ............. | 600/108 |
| 5,070,401 A | 12/1991 | Salvati et al. | | |
| 5,090,400 A * | 2/1992 | Saito | ............. | 600/108 |
| 5,784,098 A * | 7/1998 | Shoji et al. | ............. | 348/45 |
| 6,464,633 B1 * | 10/2002 | Hosoda et al. | ............. | 600/178 |
| 7,235,045 B2 * | 6/2007 | Wang et al. | ............. | 600/109 |
| 7,486,805 B2 * | 2/2009 | Krattiger | ............. | 382/108 |
| 7,860,297 B2 * | 12/2010 | Wilhelm et al. | ............. | 382/141 |
| 8,103,089 B2 * | 1/2012 | Suwa et al. | ............. | 382/154 |
| 2006/0093183 A1 * | 5/2006 | Hosoi | ............. | 382/103 |
| 2007/0009150 A1 * | 1/2007 | Suwa et al. | ............. | 382/154 |
| 2007/0112247 A1 * | 5/2007 | Hirata | ............. | 600/101 |
| 2007/0121121 A1 * | 5/2007 | Wilhelm et al. | ............. | 356/511 |
| 2008/0036856 A1 * | 2/2008 | Yamada et al. | ............. | 348/72 |
| 2008/0058594 A1 * | 3/2008 | Xie et al. | ............. | 600/109 |
| 2008/0130015 A1 * | 6/2008 | Lu | ............. | 356/610 |
| 2008/0237505 A1 * | 10/2008 | Rodrigues et al. | ............. | 250/580 |
| 2009/0003686 A1 * | 1/2009 | Gu | ............. | 382/154 |
| 2009/0225320 A1 | 9/2009 | Bendall et al. | | |
| 2009/0225321 A1 | 9/2009 | Bendall et al. | | |
| 2009/0225329 A1 | 9/2009 | Bendall et al. | | |
| 2009/0225333 A1 * | 9/2009 | Bendall et al. | ............. | 356/626 |
| 2010/0085577 A1 * | 4/2010 | Kostka et al. | ............. | 356/610 |
| 2010/0328484 A1 * | 12/2010 | Yamada | ............. | 348/222.1 |

(Continued)

FOREIGN PATENT DOCUMENTS

| | | |
|---|---|---|
| JP | H05-280945 | 10/1993 |
| JP | 2002-257528 | 9/2002 |

(Continued)

*Primary Examiner* — Christopher S Kelley
*Assistant Examiner* — Deirdre Beasley
(74) *Attorney, Agent, or Firm* — Scully, Scott, Murphy & Presser, P.C.

(57) ABSTRACT

An inspection apparatus includes: an insertion portion which is inserted into a device under inspection; a projection unit which projects a striped pattern including a plurality of linear patterns onto an object; an imaging unit which is provided in the insertion portion and images the object onto which the striped pattern is projected and generates image data; a specification unit which specifies an area of interest of the object in an image based on a position of the striped pattern in the image based on the image data; and a measurement unit which measures the area of the object using the image data.

10 Claims, 24 Drawing Sheets

(56) References Cited

U.S. PATENT DOCUMENTS

| | | | |
|---|---|---|---|
| 2011/0038530 A1* | 2/2011 | Gu | 382/154 |
| 2011/0080471 A1* | 4/2011 | Song et al. | 348/46 |
| 2011/0081072 A1* | 4/2011 | Kawasaki et al. | 382/154 |
| 2012/0019653 A1* | 1/2012 | Hori | 348/136 |
| 2012/0092463 A1* | 4/2012 | Liu et al. | 348/50 |
| 2012/0120412 A1* | 5/2012 | Bellis et al. | 356/603 |
| 2012/0162371 A1* | 6/2012 | Ota | 348/46 |

FOREIGN PATENT DOCUMENTS

| | | |
|---|---|---|
| JP | 2003-014426 | 1/2003 |
| JP | 3475245 | 12/2003 |
| JP | 2009-150773 | 7/2009 |
| JP | 2009-180689 | 8/2009 |

* cited by examiner

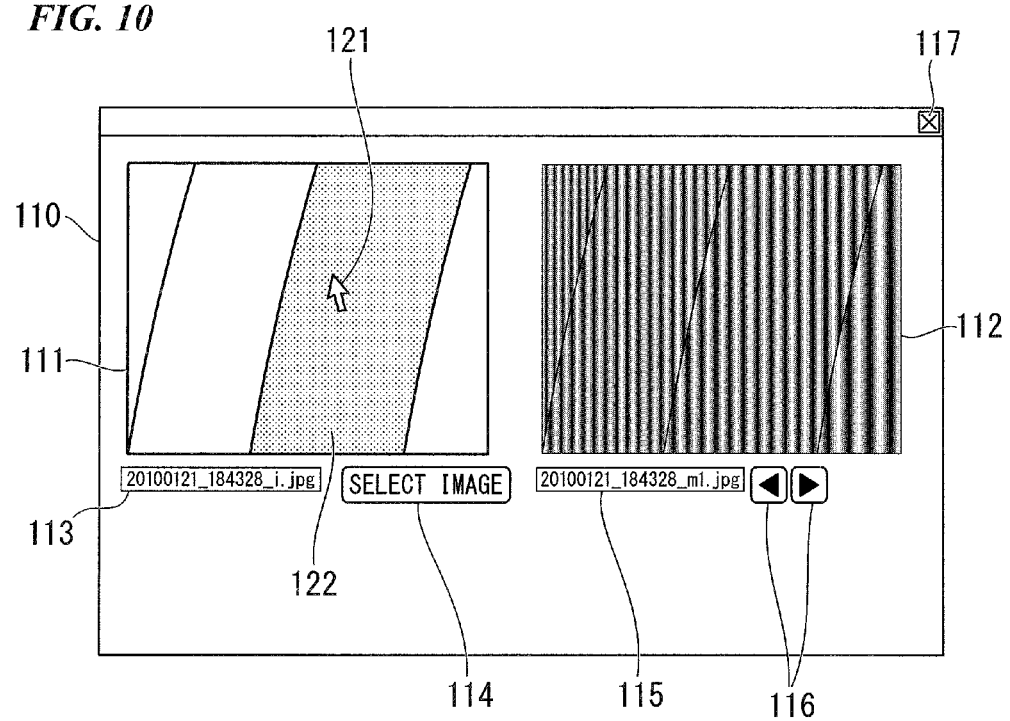
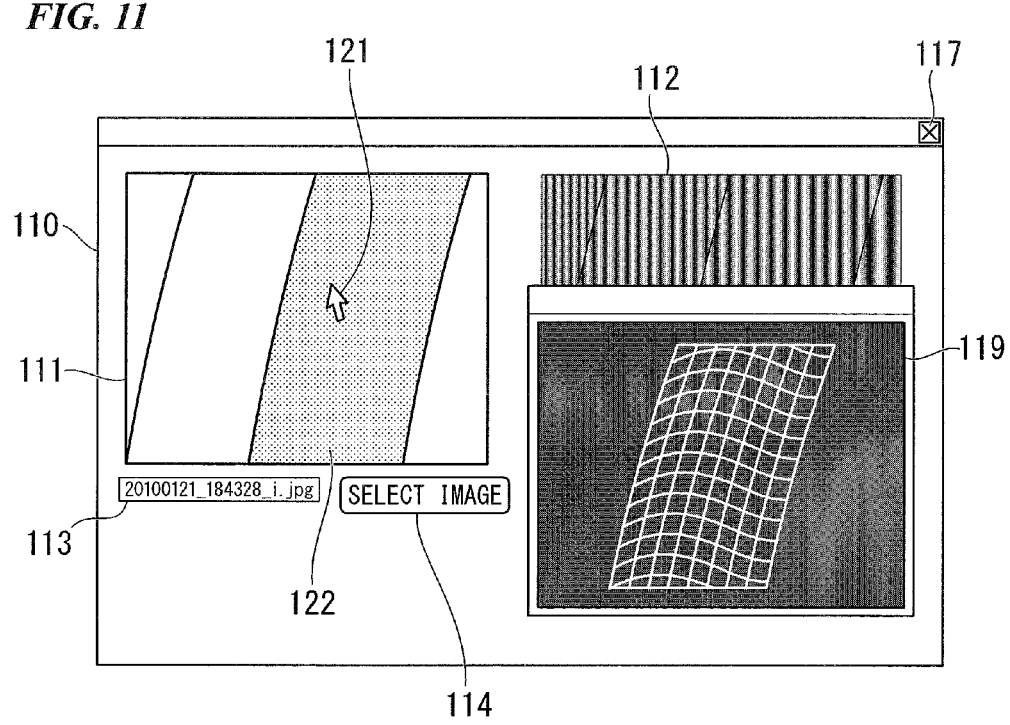

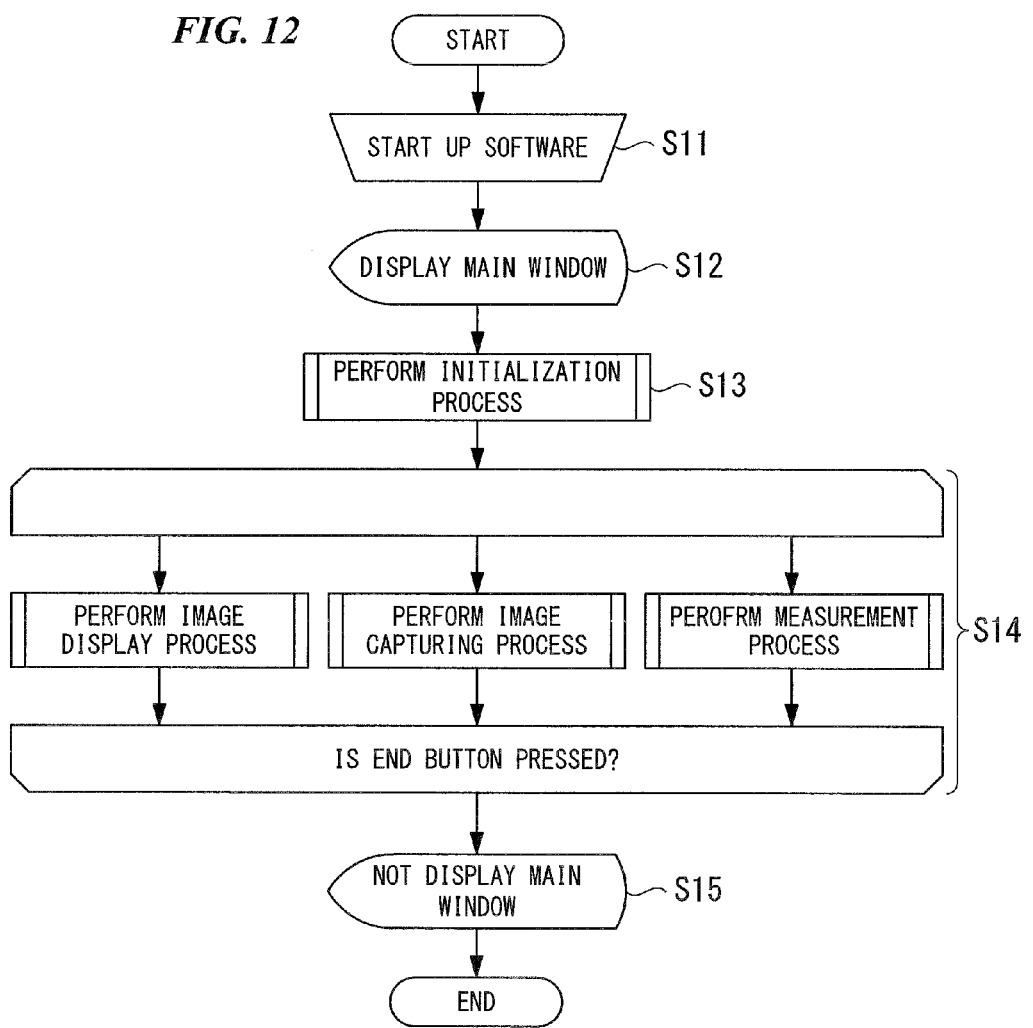
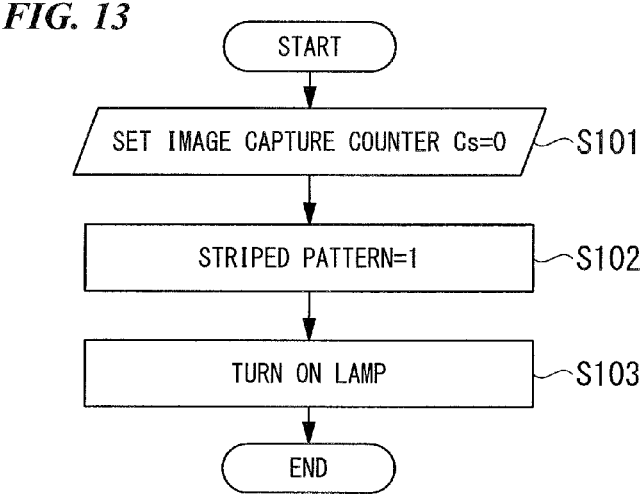

BRIGHTNESS

COORDINATE

BRIGHTNESS

COORDINATE 4001
4002  4003  4004

4301
4302  4303  4304

US 8,704,890 B2

INSPECTION APPARATUS AND MEASURING METHOD

BACKGROUND OF THE INVENTION

1. Field of the Invention

The present invention relates to an inspection apparatus measuring an object based on image data acquired by imaging an object and a measuring method.

2. Description of Related Art

Industrial endoscope apparatuses are used for observation or inspection of internal damage or corrosion of boilers, turbines, engines, pipes, and the like. An endoscope apparatus having functions of projecting a striped pattern onto an object, taking an object image including the striped pattern with an endoscope, and performing a measurement using a phase shift method is known.

US Patent Publication No. 2009/0225333 discloses an endoscope apparatus performing a measurement using the above-mentioned phase shift method.

SUMMARY OF THE INVENTION

According to an aspect of the invention, there is provided an inspection apparatus includes: an insertion portion which is inserted into a device under inspection; a projection unit which projects a striped pattern including a plurality of linear patterns onto an object; an imaging unit which is provided in the insertion portion and images the object onto which the striped pattern is projected and generates image data; a specification unit which specifies an area of interest of the object in an image based on a position of the striped pattern in the image based on the image data; and a measurement unit which measures the area of the object using the image data.

BRIEF DESCRIPTION OF THE DRAWINGS

FIG. 10 is a diagram schematically illustrating the measurement window displayed on the display according to the first embodiment of the invention.

FIG. 11 is a diagram schematically illustrating the measurement window displayed on the display according to the first embodiment of the invention.

FIG. 12 is a flowchart illustrating a flow of operations of the endoscope apparatus according to the first embodiment of the invention.

FIG. 13 is a flowchart illustrating a flow of an initialization process according to the first embodiment of the invention.

DETAILED DESCRIPTION OF THE PREFERRED EMBODIMENTS (First Embodiment)

Figure 1:
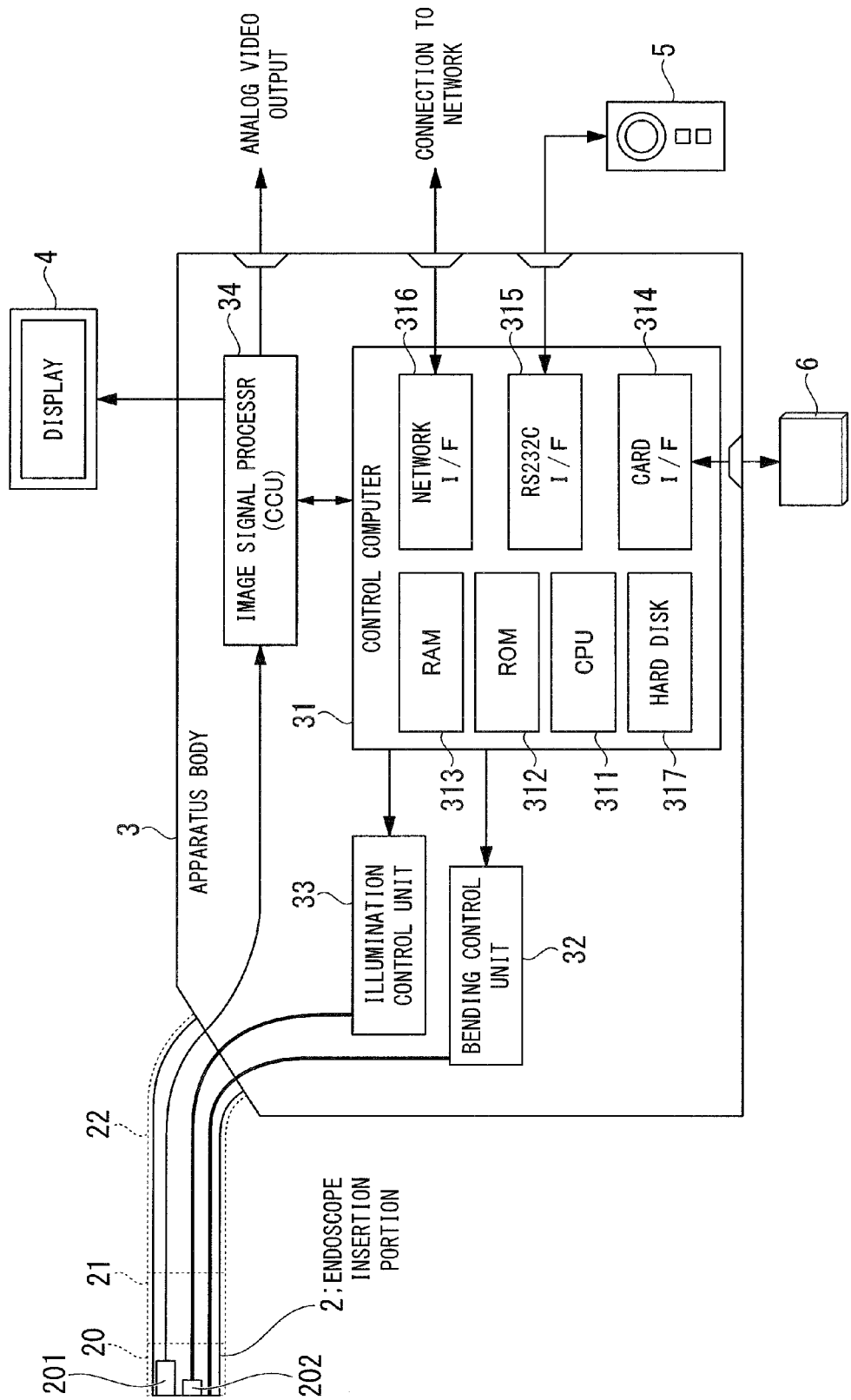
FIG. 1 is a diagram schematically illustrating a configuration of an endoscope apparatus according to a first embodiment of the invention.

Hereinafter, a first embodiment of the invention will be described with reference to the accompanying drawings. FIG. 1 shows the configuration of an inspection apparatus according to the first embodiment of the invention. As shown in FIG. 1, the inspection apparatus 1 includes an endoscope insertion portion 2 and an apparatus body 3 connected to the endoscope insertion portion 2.

The endoscope insertion portion 2 includes a distal end portion 20 formed of a hard material, a bending portion 21 which can be bended in all directions, and a flexible tube portion 22 having flexibility, which are sequentially connected from the distal end. And the endoscope insertion portion 2 is inserted into a device under inspection, a jet engine which contains a plurality of blades for example. An imaging unit 201 and an illumination unit 202 are disposed in the distal end portion 20. The detailed configuration of the distal end portion 20 will be described later.

A control computer 31, a bending control unit 32, an illumination control unit 33, and an image signal processor 34 (CCU) are disposed in the apparatus body 3.

The control computer 31 includes a CPU 311, a ROM 312, a RAM 313, a card I/F 314 (card interface), an RS-232C I/F 315 (RS-232C interface), a network OF 316 (network interface), and a hard disk 317.

The CPU 311 controls the units of the inspection apparatus 1 to perform processes suitable for the purposes and controls the overall operation of the inspection apparatus 1, by executing programs stored in the ROM 312. The RAM 313 is used as a work area for temporarily storing data by the CPU 311.

An operation unit 5 giving an operation instruction to the inspection apparatus 1 is connected to the RS-232C I/F 315. When a user operates the operation unit 5, communication necessary for controlling the operations of the inspection apparatus 1 is performed based on the operated details.

A memory card 6 can be detachably mounted on the card I/F 314. By mounting the memory card 6 on the card I/F 314, control process information or image information stored in the memory card 6 can be input or data such as the control process information or the image information can be recorded in the memory card 6, under the control of the CPU 311.

The network I/F 316 is an interface connecting the inspection apparatus 1 to another apparatus via a communicable network. Accordingly, for example, image data and the like can be transmitted to an external personal computer.

The hard disk 317 stores various data.

The bending control unit 32 is connected to the bending portion 21 of the endoscope insertion portion 2 and bends the bending portion 21. Accordingly, the distal end portion 20 can be moved in all directions.

The illumination control unit 33 is connected to the illumination unit 202 built in the distal end portion 20 and controls the illumination unit 202. Specifically, the illumination control unit 33 controls the ON and OFF states of a visible light LED (Light Emitter Diode) or an ultraviolet light LED of the illumination unit 202 or controls the pattern switching of a pattern filter of the illumination unit 202.

The image signal processor 34 composes a graphic image signal, inspection image data, and measurement image data which are generated under the control of the CPU 311 so as to display a main window or a measurement window, and outputs the composed signals to a display 4 or an external terminal. The image signal processor 34 can also perform a process for independently displaying an image such as an endoscope image (inspection image, measurement image, or the like) or an operation menu. Accordingly, the main window, the measurement window, the endoscope image, the operation menu image, or the like are displayed on the screen of the display 4.

Figure 2:
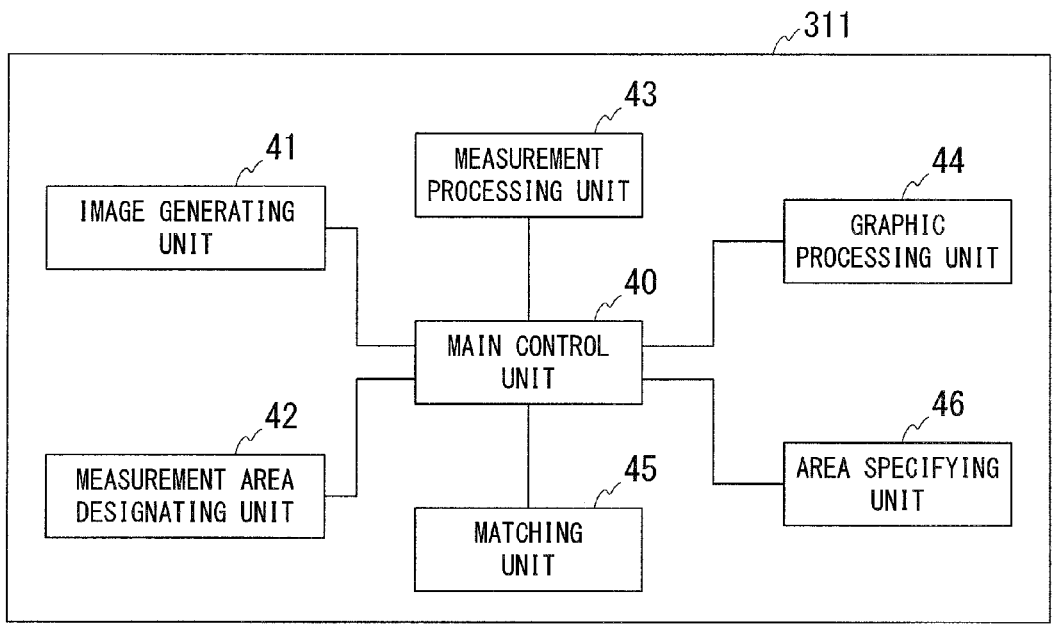
FIG. 2 is a block diagram illustrating the functional configuration of a CPU according to the first embodiment of the invention.

Next, the functional configuration of the CPU 311 will be described. FIG. 2 is a block diagram illustrating the functional configuration of the CPU 311 according to this embodiment. In the shown example, the CPU 311 serves as a main control unit 40, an image generating unit 41, a measurement area designating unit 42, a measurement processing unit 43, a graphic processing unit 44, a matching unit 45, and an area specifying unit 46.

The main control unit 40 controls the allocation of processes to the image generating unit 41, the measurement area designating unit 42, the measurement processing unit 43, the graphic processing unit 44, the matching unit 45, and the area specifying unit 46, and controls the overall operation of the inspection apparatus 1.

The image generating unit 41 generates the inspection image data used in displaying an image and the measurement image data used in a measurement process based on an image signal supplied from the imaging unit 201 disposed in the distal end portion 20 of the endoscope insertion portion 2. The measurement area designating unit 42 designates an area to be measured in an image displayed on the display 4 based on the result of a user operation using direction keys of the operation unit 5. The measurement processing unit 43 performs a process of calculating three-dimensional coordinates or a measurement process of measuring the length or area of an object based on a phase shift method using the plural measurement image data onto which a striped pattern including plural linear patterns is projected. The graphic processing unit 44 generates a graphic image signal for displaying a variety of information displayed as texts or numerical values, a cursor, and the like on a display screen. The matching unit 45 performs a matching process of calculating a position of a corresponding area in the measurement image corresponding to the position of the measurement area in the inspection image designated by the measurement area designating unit 42. The area specifying unit 46 specifies an area of the object.

Figure 3:
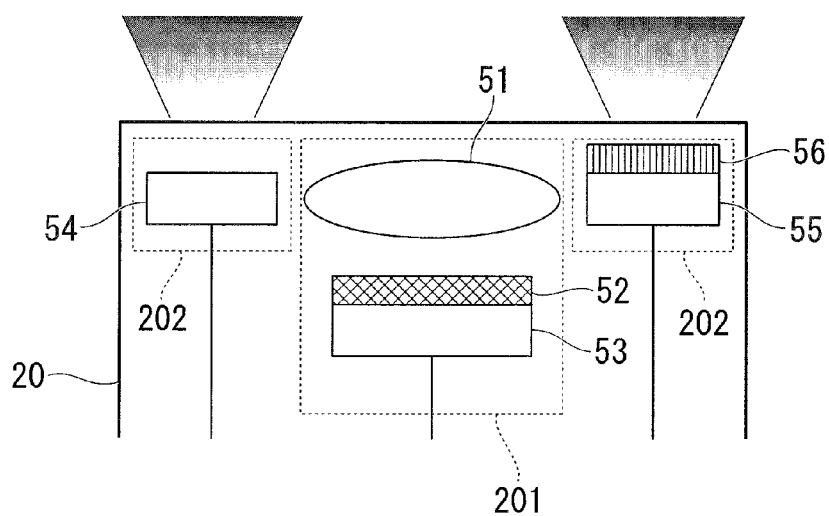
FIG. 3 is a diagram schematically illustrating the configuration of a distal end portion according to the first embodiment of the invention.

The configuration of the distal end portion 20 will be described. FIG. 3 is a diagram schematically illustrating the configuration of the distal end portion 20 according to this embodiment. In the shown example, the imaging unit 201 and the illumination unit 202 are disposed in the distal end portion 20. The imaging unit 201 includes an imaging optical system 51, a color filter 52, and an imaging device 53. The color filter 52 is disposed on the light-receiving surface of the imaging device 53. The imaging optical system 51 forms an object image on the light-receiving surface of the imaging device 53. The color filter 52 is a filter transmitting only light in a specific wavelength band. The imaging device 53 photoelectrically converts the object image formed by the imaging optical system 51 and the color filter 52 to generate an image signal. The configuration of the color filter 52 will be described later.

The illumination unit 202 includes a visible light LED 54, an ultraviolet light LED 55, and a pattern filter 56. The visible light LED 54 emits visible light to be applied to the object. The ultraviolet light LED 55 emits ultraviolet light to be applied to the object. The pattern filter 56 is a filter blocking the emitted ultraviolet light emitted from the ultraviolet light LED 55 in a striped shape and is disposed on the ultraviolet light-emitting surface of the ultraviolet light LED 55. Accordingly, the ultraviolet light emitted from the ultraviolet light LED 55 projects a striped pattern onto the object through the pattern filter 56.

The pattern filter 56 switches its pattern among striped pattern "1", striped pattern "2", and striped pattern "3" under the control of the illumination control unit 33. Striped patterns "1" to "3" partially block the ultraviolet light emitted from the ultraviolet light LED 55 and include plural linear patterns having different phases. By switching the striped patterns, it is possible to project striped patterns having different phases onto the object.

Figure 4:
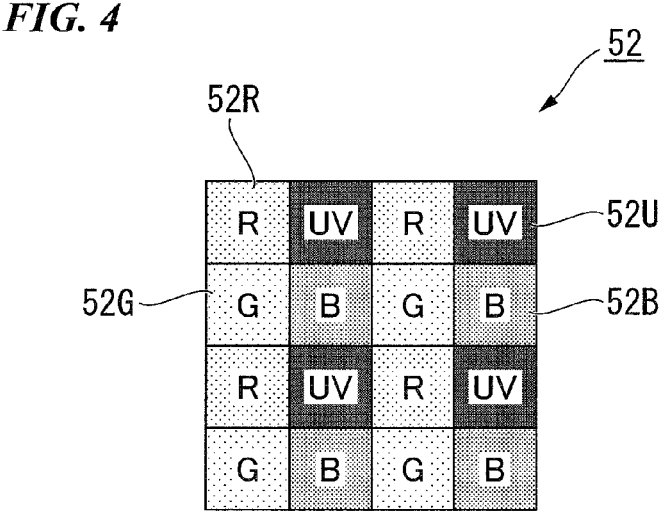
FIG. 4 is a diagram schematically illustrating an arrangement of color filters according to the first embodiment of the invention.

The configuration of the color filter 52 will be described. FIG. 4 is a diagram schematically illustrating the configuration of the color filter 52 according to this embodiment. In the shown example, the color filter 52 includes color filters 52R transmitting only red light, color filters 52G transmitting only green light, color filters 52B transmitting only blue light, and color filters 52U transmitting only ultraviolet light.

The color filter 52R and the color filter 52U are alternately arranged in the odd lines of the color filter 52. The color filter 52G and the color filter 52B are alternately arranged in the even lines of the color filter 52. The imaging device 53 includes plural pixels and one of the color filters 52R, 52G, 52B, and 52U is disposed in each pixel of the imaging device 53.

Accordingly, the pixel having the color filter 52R disposed therein photoelectrically converts red light out of light incident from the object to generate an image signal. The pixel having the color filter 52G disposed therein photoelectrically converts green light out of the light incident from the object to generate an image signal. The pixel having the color filter 52B disposed therein photoelectrically converts blue light out of the light incident from the object to generate an image signal. The pixel having the color filter 52U disposed therein photoelectrically converts ultraviolet light out of the light incident from the object to generate an image signal.

Therefore, when the visible light LED 54 and the ultraviolet light LED 55 are applying light to the object, the imaging device 53 can generate image data based on an object image formed by the visible light and image data based on an object image formed by the ultraviolet light.

A method of generating inspection image data and measurement image data from the image data generated by the imaging device 53 will be described. The image data generated by the imaging device 53 is processed by the image signal processor 34 and is input to the image generating unit 41. The image generating unit 41 generates the inspection image data based on data corresponding to the pixels having the color filter 52R, the pixels having the color filter 52G, and the pixels having the color filters 52B among the input image data. The image generating unit 41 generates the measurement image data based on data corresponding to the pixels having the color filter 52U.

Figure 5:
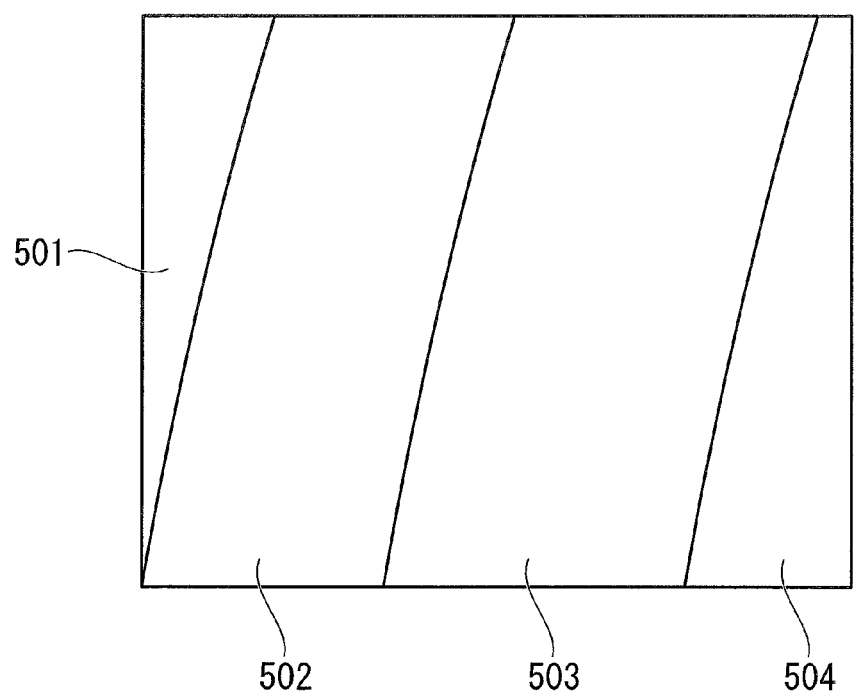
FIG. 5 is a diagram schematically illustrating an inspection image based on inspection image data generated by an image generating unit according to the first embodiment of the invention.

FIG. 5 is a diagram schematically illustrating an inspection image based on the inspection image data generated by the image generating unit 41 according to this embodiment. In the shown example, the inspection image includes blades 501 to 504. When this image is captured, a striped pattern based on the ultraviolet light is projected to the blades 501 to 504 by the ultraviolet light LED 55 and the pattern filter 56. However, since the image generating unit 41 generates the inspection image data based on the data corresponding to the pixels having the color filter 52R, the pixels having the color filter 52G and the pixels having the color filter 52B, the inspection image data does not include the striped pattern based on the ultraviolet light.

Figure 6:
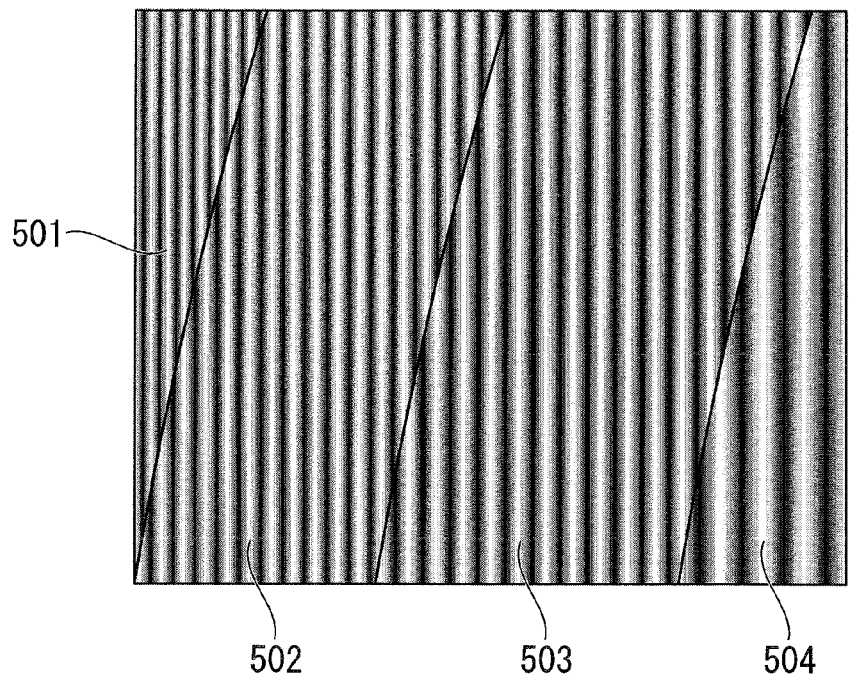
FIG. 6 is a diagram schematically illustrating a measurement image based on measurement image data generated by the image generating unit according to the first embodiment of the invention.

FIG. 6 is a diagram schematically illustrating the measurement image based on the measurement image data generated by the image generating unit 41 according to this embodiment. In the shown example, the measurement image includes blades 501 to 504. When this image is captured, a striped pattern based on the ultraviolet light is projected to the blades 501 to 504 by the ultraviolet light LED 55 and the pattern filter 56. Since the image generating unit 41 generates the measurement image data based on the data corresponding to the pixels having the color filter 52U, the measurement image data includes data of the striped pattern.

Figure 7:
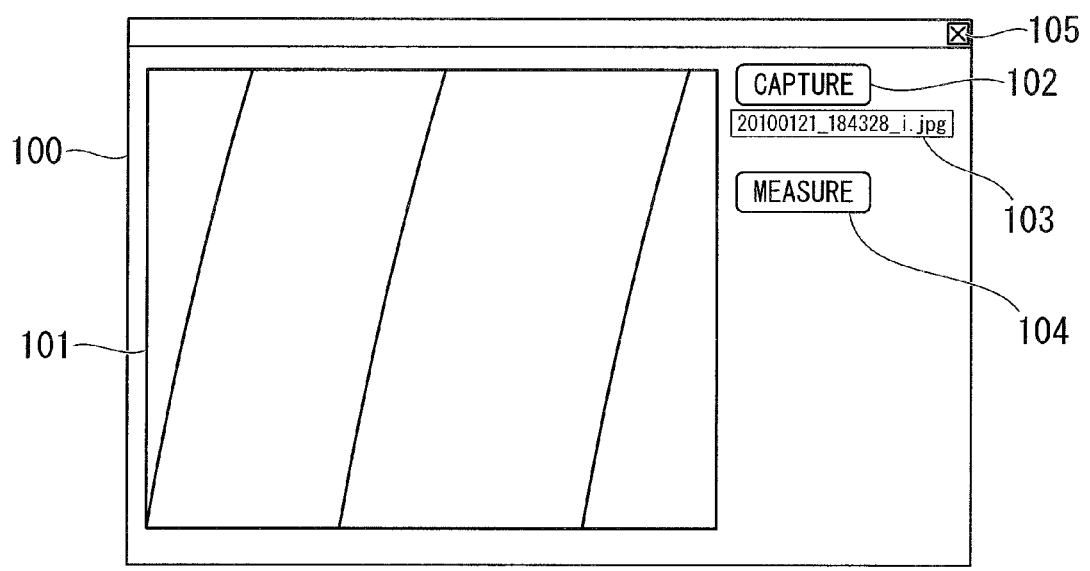
FIG. 7 is a diagram schematically illustrating a main window displayed on a display according to the embodiment of the invention.

A display screen in this embodiment will be described. FIG. 7 shows a main window 100 displayed on the display 4 after the inspection apparatus 1 is started up. The main window 100 displays a live video box 101 displaying the inspection image, an image capture button 102 receiving an input instructing to capture an image, a file name box 103 displaying a file name of the captured inspection image data, a measurement button 104 receiving an input instructing to start the measurement, and an end button 105 receiving an input instructing to end the operation of the inspection apparatus 1.

FIGS. 8 to 11 show a measurement window 110 displayed on the display 4 when the inspection apparatus 1 performs a measurement process. In the shown example, the measurement window 110 includes an inspection image box 111 displaying an inspection image, a measurement image box 112 displaying a measurement image, a file name box 113 displaying a file name of the inspection image data, an image selection button 114 receiving an input instructing to select an inspection image, a file name box 115 displaying a file name of the measurement image data, an image switching button 116 receiving an input instructing to select a measurement image, and an end button 117 receiving an input instructing an end of the measurement process.

The measurement window 110 is a modal window, and the main window 100 cannot be operated while the measurement window 110 is being displayed on the display 4.

Figure 8:
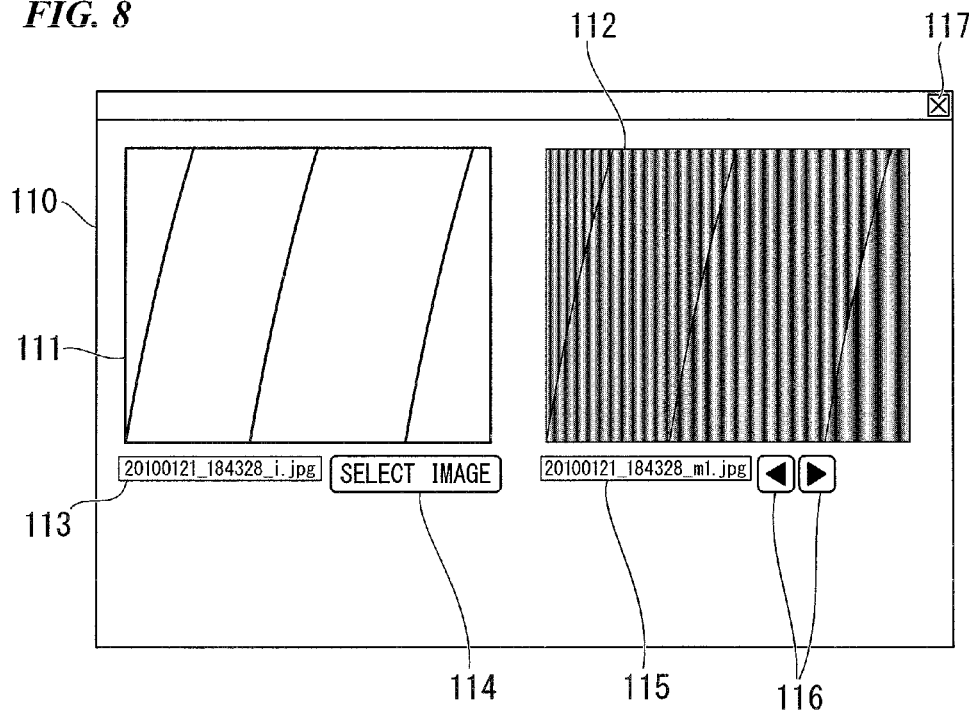
FIG. 8 is a diagram schematically illustrating a measurement window displayed on the display according to the first embodiment of the invention.

FIG. 8 is a diagram schematically illustrating the measurement window 110. The user can change the inspection image displayed on the inspection image box 111 by pressing the image selection button 114. The user can sequentially switch the measurement image displayed in the measurement image box 112 among three measurement images captured almost at the same time as the inspection image displayed in the inspection image box 111, by pressing the image switching button 116.

Figure 9:
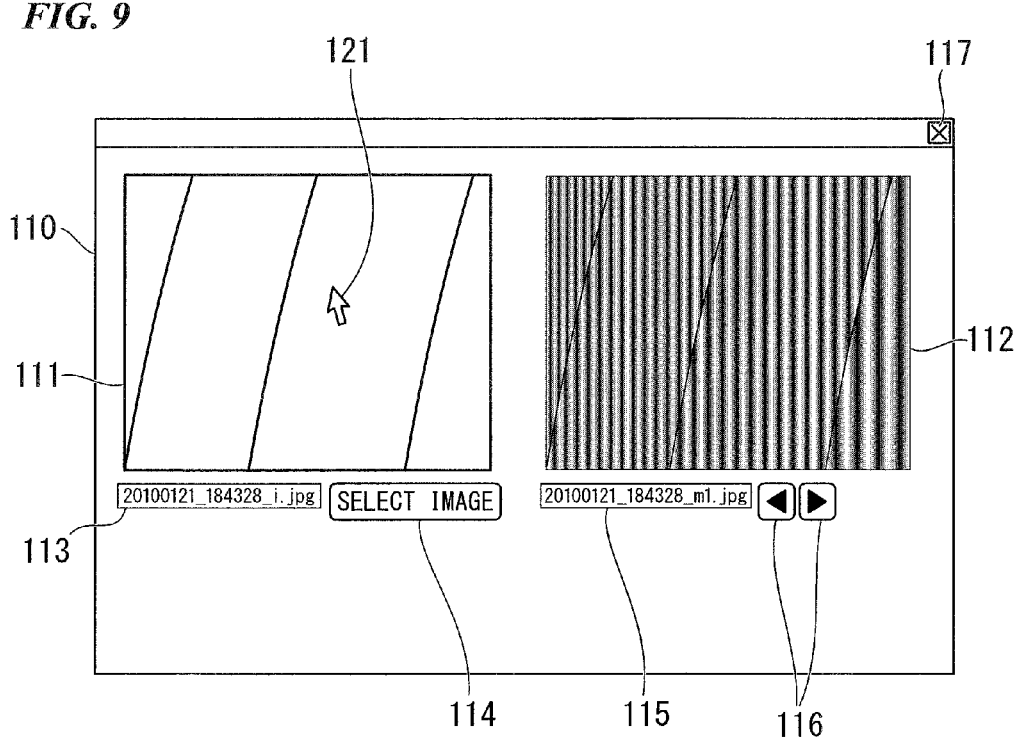
FIG. 9 is a diagram schematically illustrating the measurement window displayed on the display according to the first embodiment of the invention.

FIG. 9 is a diagram schematically illustrating the measurement window 110 when the user selects a measurement area. A cursor 121 for designating a measurement area is displayed in the inspection image displayed in the measurement image box 111. The user can move the cursor 121 in the direction designated by the direction keys by operating the direction keys of the operation unit 5. For example, when the downward direction is input by the direction keys of the operation unit 5 in the state where the cursor 121 is displayed in the inspection image box 111, the cursor 121 moves downward.

FIG. 10 is a diagram schematically illustrating the measurement window 110 when the user selects a measurement area. The user selects the measurement area by moving the cursor 121 onto a blade to be measured by using the direction keys of the operation unit 5 and pressing a measurement key of the operation unit 5. In the shown example, the measurement area 122 selected by the user is displayed by emphasis in the inspection image displayed in the inspection image box 111.

FIG. 11 is a diagram schematically illustrating the measurement window 110 when a measurement result window 119 is displayed. The measurement result window 119 displaying the measurement result of the measurement area is displayed on the, measurement window 110. In the shown example, the shape of the surface of the measurement area is three-dimensionally displayed in the measurement result window 119.

The flow of operations of the inspection apparatus 1 according to this embodiment will be described. FIG. 12 is a flowchart illustrating the flow of operations of the inspection apparatus 1 according to this embodiment.

(Step S11) The CPU 311 of the inspection apparatus 1 starts up software when a power supply is turned on. The CPU 311 serves as the main control unit 40, the image generating unit 41, the measurement area designating unit 42, the measurement processing unit 43, the graphic processing unit 44, the matching unit 45, and the area specifying unit 46 based on the started-up software. Thereafter, the process of step S12 is performed.

(Step S12) The main control unit 40 controls the imaging unit 201, the illumination control unit 33, the image signal processor 34, the image generating unit 41, and the graphic processing unit 44. Accordingly, the units start their operations and the main window 101 is displayed on the display 4. Thereafter, the process of step S13 is performed.

(Step S13) The main control unit 40 performs an initialization process. Thereafter, the process of step S14 is performed. The initialization process will be described later.

(Step S14) The main control unit 40 repeatedly performs a video display process, an image capturing process, and a measurement process until the end button 105 of the main window 100 is pressed. The video display process, the image capturing process, and the measurement process will be described later. When the end button 105 of the main window 100 is pressed, the process of step S15 is performed. The main control unit 40 performs the video display process and the image capturing process in synchronization with each other. Specifically, the main control unit 40 performs the video display process and the image capturing process again after both the video display process and the image capturing process are ended. The main control unit 40 repeatedly performs the measurement process without synchronization with other processes.

(Step S15) The main control unit 40 ends the process of displaying the main window 100 (the main window 100 is not displayed). Thereafter, the flow is ended.

The initialization process of step S13 in the flowchart shown in FIG. 12 will be described. FIG. 13 is a flowchart illustrating a flow of the initialization process in this embodiment.

(Step S101) The main control unit 40 stores an image capture counter Cs=0 in the RAM 313. The image capture counter Cs is a counter number of an image which is being captured, and has values of 0 to 4. Thereafter, the process of step S102 is performed.

(Step S102) The main control unit 40 controls the illumination control unit 33 to change the striped pattern of the pattern filter 56 of the illumination unit 202 to "striped pattern 1". Thereafter, the process of step S103 is performed.

(Step S103) The main control unit 40 controls the illumination control unit 33 to turn on the visible light LED 54 and the ultraviolet light LED 55 of the illumination unit 202. Thereafter, the initialization process is ended.

Figure 14:
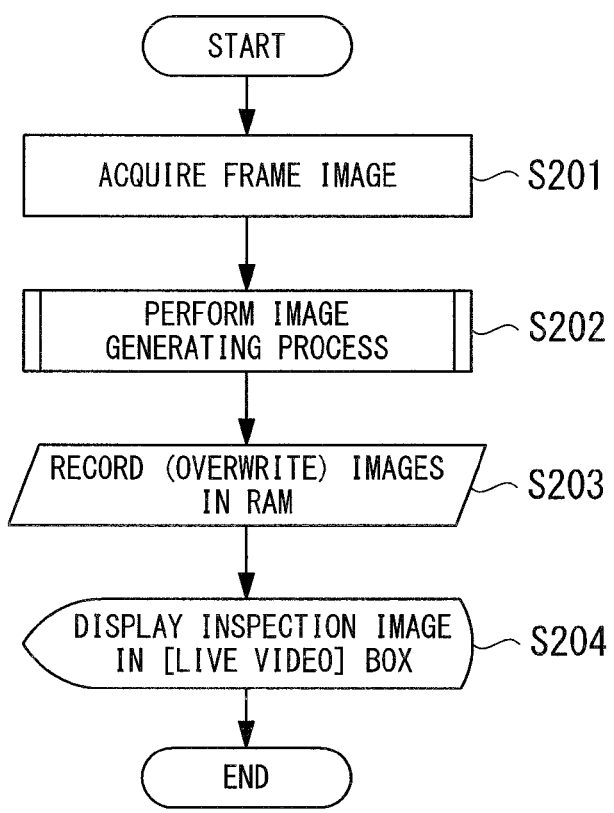
FIG. 14 is a flowchart illustrating a flow of a video display process according to the first embodiment of the invention.

The video display process of step S14 in the flowchart shown in FIG. 12 will be described. FIG. 14 is a flowchart illustrating the flow of the video display process in this embodiment.

(Step S201) The image generating unit 41 acquires frame image data (image data) generated by the image capturing of the imaging unit 201. The frame image data is image data corresponding to one frame acquired from the imaging device 53. Thereafter, the process of step S202 is performed.

(Step S202) The image generating unit 41 generates the inspection image data and the measurement image data from the image data acquired in step S201. Thereafter, the process of step S203 is performed. The process of generating the inspection image data and the measurement image data will be described later.

(Step S203) The main control unit 40 stores the inspection image data and the measurement image data generated by the image generating unit 41 in step S202 in the RAM 313. When the RAM 313 previously stores the inspection image data and the measurement image data, the inspection image data and the measurement image data newly generated in step S202 are written over the data previously stored in the RAM 313. Thereafter, the process of step S204 is performed.

(Step S204) The image signal processor 34 displays an inspection image based on the inspection image data generated by the image generating unit 41 in step S202 in the live video box of the main window 100. Thereafter, the video display process is ended.

Figure 15:
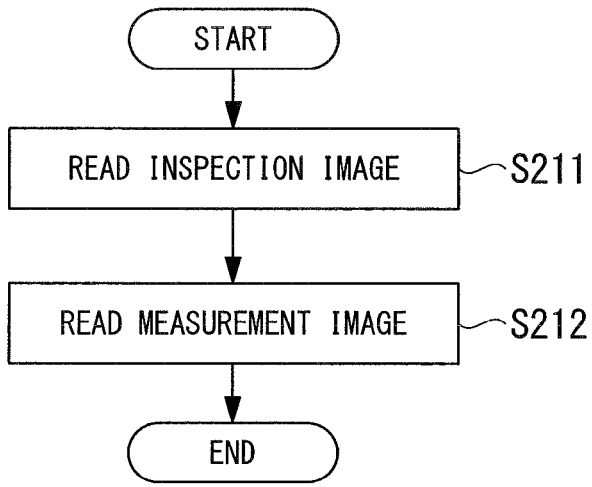
FIG. 15 is a flowchart illustrating a flow of processes of generating the inspection image data and the measurement image data according to the first embodiment of the invention.

The flow of the process of generating the inspection image data and the measurement image data in step S202 of the flowchart shown in FIG. 12 will be described. FIG. 15 is a flowchart illustrating the flow of the process of generating the inspection image data and the measurement image data in this embodiment.

(Step S211) The image generating unit 41 generates the inspection image data based on the data corresponding to the pixels having the color filter 52R, the pixels having the color filter 52G, and the pixels having the color filter 52B out of the image data. Thereafter, the process of step S212 is performed.

(Step S212) The image generating unit 41 generates the measurement image data based on the data corresponding to the pixels having the color filter 52U out of the image data. Thereafter, the flow of the process of generating the inspection image data and the measurement image data is ended.

Figure 16:
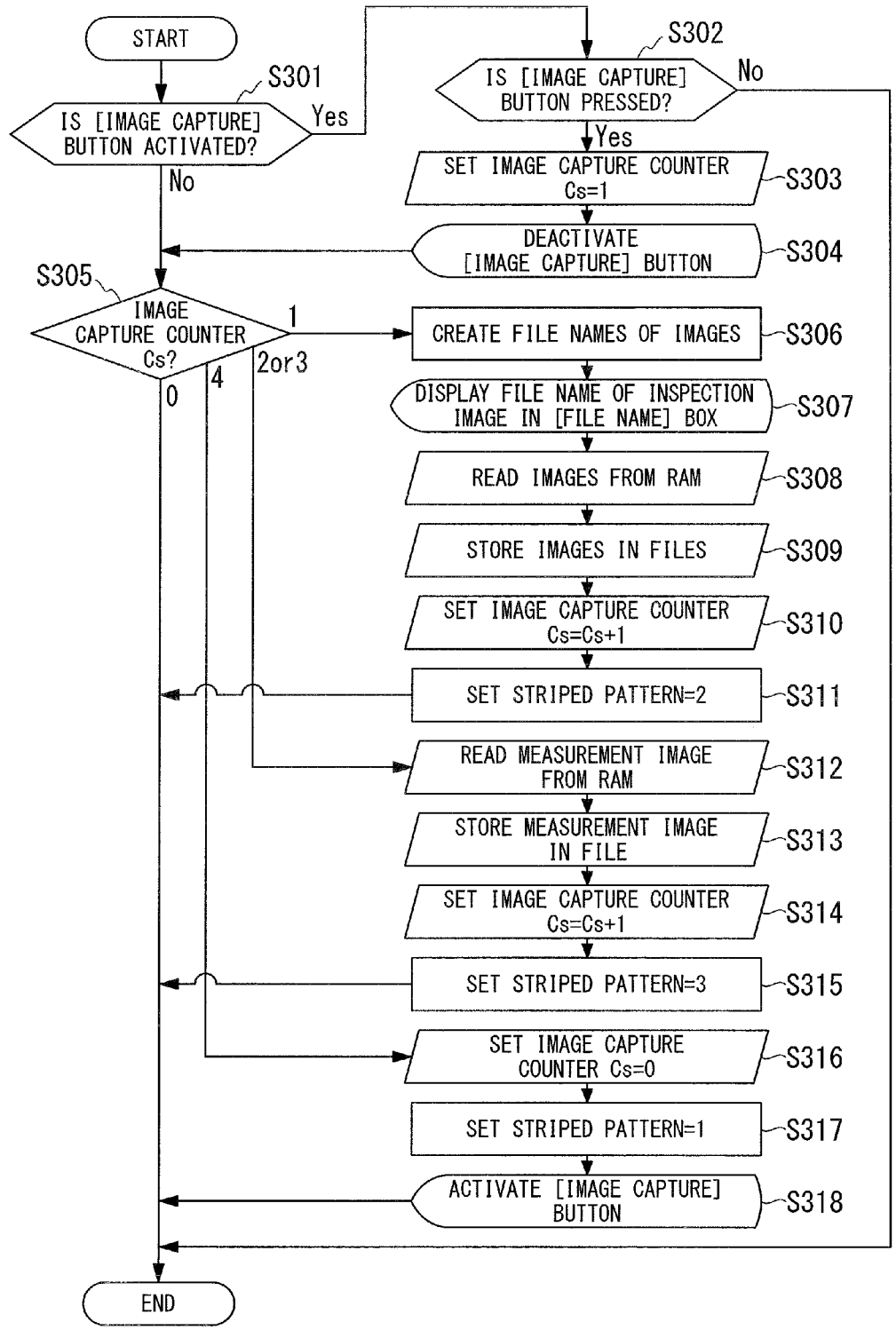
FIG. 16 is a flowchart illustrating a flow of an image capturing process according to the first embodiment of the invention.

The image capturing process of step S14 in the flowchart shown in FIG. 12 will be described. FIG. 16 is a flowchart illustrating the flow of the image capturing process in this embodiment.

(Step S301) The main control unit 40 determines whether the image capture button of the main window 100 is activated (in a pressing-possible state). When the main control unit 40 determines that the image capture button of the main window 100 is activated, the process of step S302 is performed. Otherwise, the process of step S305 is performed.

(Step S302) The main control unit 40 determines whether the image capture button of the main window 100 is pressed. When the main control unit 40 determines that the image capture button of the main window 100 is pressed, the process of step S303 is performed. Otherwise, the image capturing process is ended.

(Step S303) The main control unit 40 stores an image capture counter Cs=1 in the RAM 313. Thereafter, the process of step S304 is performed.

(Step S304) The main control unit 40 deactivates the image capture button of the main window 100 (a pressing-impossible state). Thereafter, the process of step S305 is performed.

(Step S305) The main control unit 40 reads the image capture counter Cs stored in the RAM 313. The main control unit 40 performs the process of step S306 when the read image capture counter Cs is "1", performs the process of step S312 when the image capture counter is "2" or "3", performs the process of step S316 when the image capture counter is "4", and ends the image capturing process when the image capture counter is "0".

(Step S306) The main control unit 40 generates the file name of the inspection image data and the file name of the measurement image data based on the date and time of creating the file names. Thereafter, the process of step S307 is performed. For example, it is assumed that the file name of the inspection image data is "file name creating date_file name creating time_i.jpg", and the file names of the measurement image data is "file name creating date_file name creating time_m1.jpg", "file name creating date_file name creating time_m2.jpg", and "file name creating date_file name creating time_m3.jpg". Specifically, when the creating date and time of the file name is "18:43:28 on Jan. 21, 2010", the file name of the inspection image is "20100121_184328_i.jpg" and the file names of the measurement image data are "20100121_184328_m1.jpg", "20100121_184328_m2.jpg", and "20100121_184328_m3.jpg". "i" in the file name is a sign for identifying the inspection image data and "m" in the file names is a sign for identifying the measurement image data. In the file names of the measurement image data, the number after m represents the value of the image capture counter Cs at the time of storing the measurement image data.

(Step S307) The main control unit 40 displays the file name of the inspection image data generated in step S306 in the file name box 103 of the main window 100. Thereafter, the process of step S308 is performed.

(Step S308) The main control unit 40 reads the inspection image data and the measurement image data stored in the RAM 313. Thereafter, the process of step S309 is performed.

(Step S309) The main control unit 40 gives the file names generated in step S306 to the inspection image data and the measurement image data read in step S308 and stores the resultant in the hard disk 317. Thereafter, the process of step S310 is performed. In step S309, since the image capture counter Cs is "1", the file name of the measurement image data is "file name creating date_file name creating time_m1.jpg".

(Step S310) The main control unit 40 adds "1" to the image capture counter Cs and stores the resultant image capture counter Cs in the RAM 313. Thereafter, the process of step S311 is performed. Since the image capture counter Cs is "1" before the process of step S310, the image capture counter Cs is "2" after the process of step S310.

(Step S311) The main control unit 40 controls the illumination control unit 33 to change the striped pattern of the pattern filter 56 of the illumination unit 202 to "striped pattern 2". Thereafter, the image capturing process is ended.

(Step S312) The main control unit 40 reads the measurement image data stored in the RAM 313. Thereafter, the process of step S313 is performed.

(Step S313) The main control unit 40 gives the file name generated in step S306 to the measurement image data read in step S312 and stores the resultant in the hard disk 317. Thereafter, the process of step S314 is performed. In step S313, the image capture counter Cs is "2" or "3". Accordingly, when the image capture counter Cs is "2", the file name of the measurement image data is "file name creating date_file name creating time_m2.jpg". When the image capture counter Cs is "3", the file name of the measurement image data is "file name creating date_file name creating time_m3.jpg".

(Step S314) The main control unit 40 adds "1" to the image capture counter Cs and stores the resultant image capture counter Cs in the RAM 313. Thereafter, the process of step S315 is performed.

(Step S315) The main control unit 40 controls the illumination control unit 33 to change the striped pattern of the pattern filter 56 of the illumination unit 202 to "striped pattern 3". Thereafter, the image capturing process is ended.

(Step S316) The main control unit 40 stores the image capture counter Cs=0 in the RAM 313. Thereafter, the process of step S317 is performed.

(Step S317) The main control unit 40 controls the illumination control unit 33 to change the striped pattern of the pattern filter 56 of the illumination unit 202 to "striped pattern 1". Thereafter, the process of step S318 is performed.

(Step S318) The main control unit 40 activates the image capture button of the main window 100 (pressing-possible state). Thereafter, the image capturing process is ended.

Figure 17:
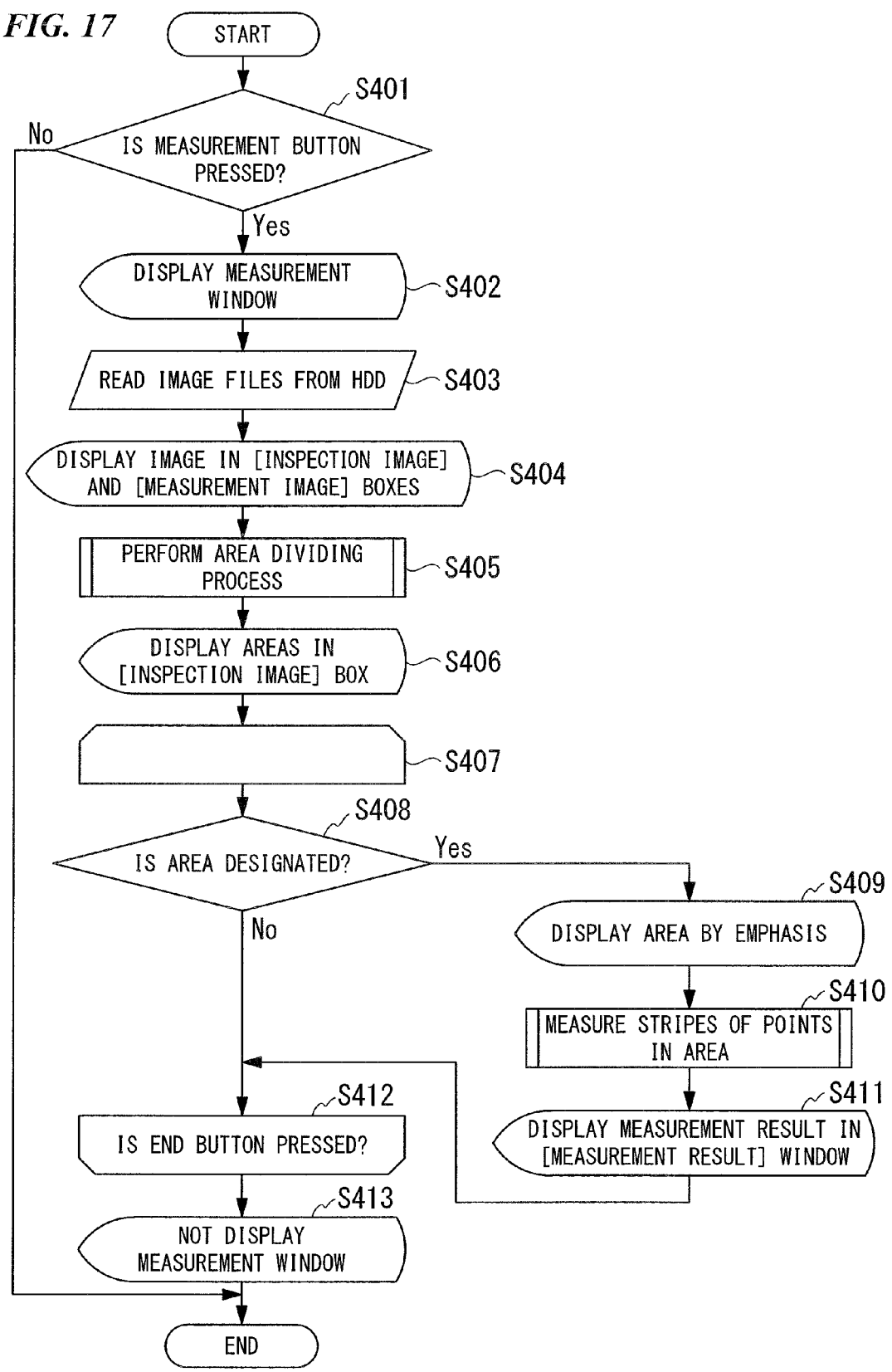
FIG. 17 is a flowchart illustrating a flow of a measurement process according to the first embodiment of the invention.

The measurement process of step S14 in the flowchart shown in FIG. 12 will be described. FIG. 17 is a flowchart illustrating the flow of the measurement process in this embodiment.

(Step S401) The main control unit 40 determines whether the measurement button of the main window 100 is pressed. When the main control unit 40 determines that the measurement button of the main window 100 is pressed, the process of step S402 is performed. Otherwise, the measurement process is ended.

(Step S402) The main control unit 40 controls the image signal processor 34, the image generating unit 41, and the graphic processing unit 44 to display the measurement window 110 on the display 4. The main control unit 40 deactivates the main window 100 (operation-impossible state). Thereafter, the process of step S403 is performed.

(Step S403) The user presses the image selection button 114 of the main window 110 to select the inspection image data including the object to be measured. Then, the main control unit 40 reads one inspection image data selected by the user and three inspection image data having the same date and time in the file names of the selected inspection image data from the hard disk 317. Thereafter, the process of step S404 is performed.

(Step S404) The main control unit 40 displays the inspection image based on the inspection image data read in step S403 in the inspection image box 111 of the measurement window 110. The main control unit 40 displays the measurement image based on the "file name creating date_file name creating time_m1.jpg" out of the three measurement image data read in step S403 in the measurement image box 112 of the measurement window 110. Thereafter, the process of step S405 is performed.

(Step S405) The area specifying unit 46 specifies the area of the object included in the measurement image using one of three measurement images read in step S403. The flow of the process of specifying the area of the object will be described later. Subsequently, the graphic processing unit 44 generates a figure representing the area of the object specified by the area specifying unit 46. Thereafter, the process of step S406 is performed.

(Step S406) The graphic processing unit 44 generates a figure representing the boundary of the area of the object specified by the area specifying unit 46 in step S405. Subsequently, the graphic processing unit 44 displays the generated figure on the inspection image displayed in the inspection image box 111. Thereafter, the process of step S407 is performed.

(Step S407) The processes of steps S407 to S412 are repeatedly performed until the end button 118 of the measurement window 110 is pressed. When the end button 118 of the measurement window 110 is pressed, the process of step S413 is performed.

(Step S408) The user operates the direction keys of the operation unit 5 at the time of performing a measurement and specifies the area to be measured while viewing the inspection image displayed in the inspection image box 111 of the measurement window 110. The main control unit 40 determines whether an area to be measured is designated by the user, based on the input from the operation unit 5. When the main control unit 40 determines that an area to be measured is designated by the user, the process of step S409 is performed. Otherwise, the process of step S412 is performed.

(Step S409) The measurement area designating unit 42 designates an area to be measured in the inspection image based on the input from the operation unit 5 in step S406. The graphic processing unit 44 displays the area designated by the measurement area designating unit 42 in the inspection image by emphasis. Thereafter, the process of step S410 is performed.

(Step S410) The measurement processing unit 43 measures plural points arranged in a lattice shape with a predetermined distance out of the points included in the area displayed by emphasis in step S409 using a phase shift method based on three measurement images read in step S403, and calculates three-dimensional coordinates of the points. The predetermined distance may be decreased to enhance the precision of the measurement result, or the predetermined distance may be increased to reduce the processes. Thereafter, the process of step S411 is performed.

Any method can be used as the measuring method, as long as it can be carried out using the measurement images. Since the periphery of the boundary of the area often includes brightness or darkness in the vicinity of the edges of the blades and thus the measurement result may be low in precision, the periphery of the boundary line of the area may not be measured. For example, the part apart from the boundary line of the area within 5 pixels may not be measured. A distance between two points may be measured.

(Step S411) The main control unit 40 controls the image signal processor 34, the image generating unit 41, the graphic processing unit 44 to display the measurement result including the result measured by the measurement processing unit 43 in step S408 in the measurement result window 119 on the display 4. For example, the shape of the surface of the area is three-dimensionally displayed based on the three-dimensional coordinates corresponding to the points in the area measured in step S410. Thereafter, the process of step S412 is performed.

(Step S412) The main control unit 40 determines whether the end button 118 of the measurement window 110 is pressed. When the main control unit 40 determines that the end button 118 of the measurement window 110 is pressed, the process of step S413 is performed. Otherwise, the process of step S407 is performed again.

(Step S413) The main control unit 40 ends the process of displaying the measurement window 110 and the measurement result window 119 (the measurement window 110 and the measurement result window 119 are not displayed). The main control unit 40 activates the main window 100 (pressing-possible state). Thereafter, the measurement process is ended.

Figure 18:
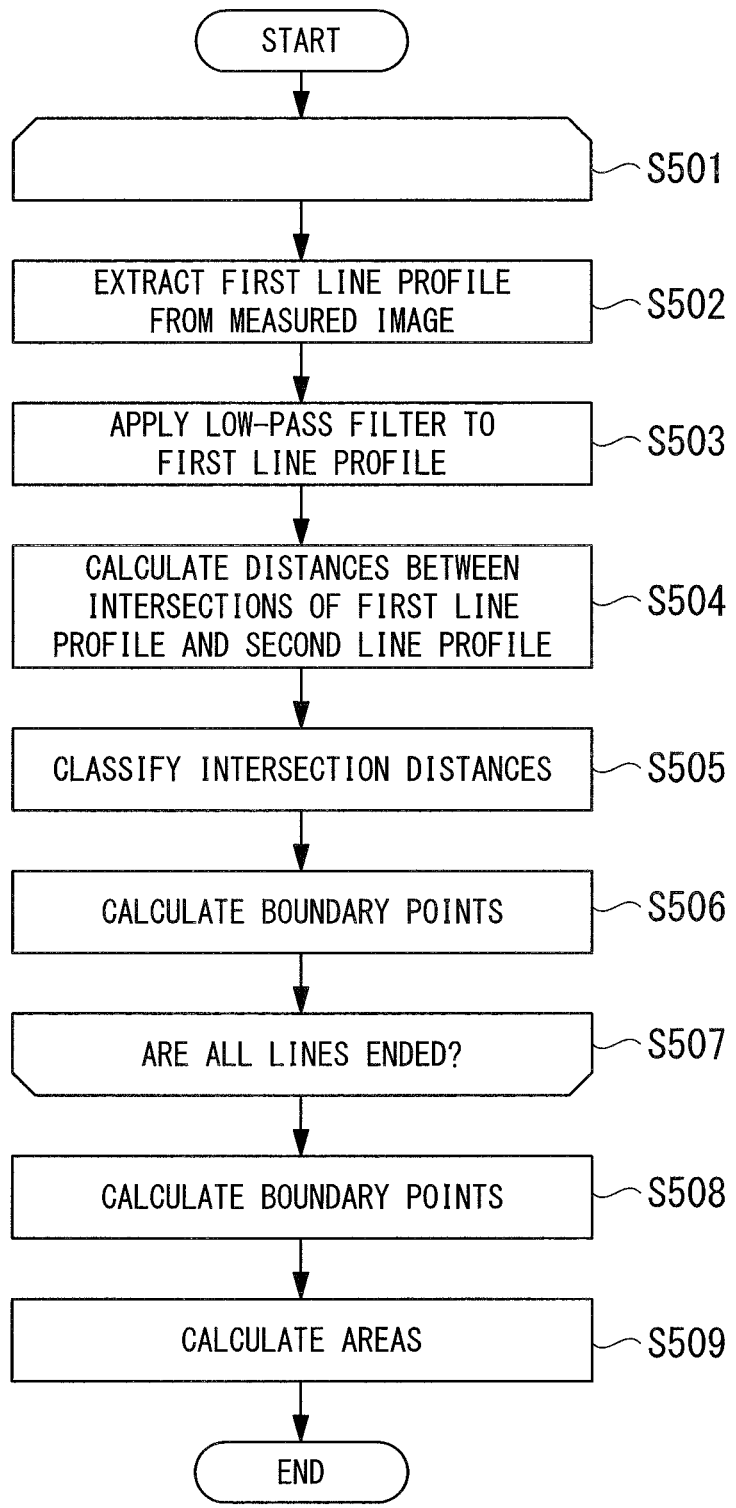
FIG. 18 is a flowchart illustrating a flow of a process of specifying an area of an object according to the first embodiment of the invention.

The process of specifying an area of an object in step S405 in the flowchart shown in FIG. 17 will be described. FIG. 18 is a flowchart illustrating the flow of the process of specifying an area of an object of this embodiment.

(Step S501) The rows of pixels in the horizontal direction in the inspection image data are called lines. The area specifying unit 46 performs the process (steps S502 to S506) of detecting boundary points in the lines with a predetermined distance. The area specifying unit 46 repeatedly performs the processes of steps S501 to S507 until the processes of steps S502 to S506 are performed on all the lines from which the boundary points should be detected. The direction of the lines is preferably perpendicular to the stripes of the striped pattern.

When the area specifying unit 46 performs the processes of steps S502 to S506 on all the lines from which the boundary points should be detected, the process of step S508 is performed.

(Step S502) The area specifying unit 46 extracts a first line profile of the line from which the boundary points should be detected. The first line profile is a graph showing the brightness of the coordinates of the line from which the boundary points should be detected. Thereafter, the process of step S503 is performed.

(Step S503) The area specifying unit 46 applies a low-pass filter to the first line profile extracted in step S502 and generates a second line profile obtained by removing a high-frequency component (specifically, striped pattern) from the first line profile. Accordingly, the second line profile showing the brightness of the coordinates in which the striped pattern is removed. Thereafter, the process of step S504 is performed.

(Step S504) The area specifying unit 46 extracts intersections of the first line profile and the second line profile, and calculates distances between neighboring intersections. Thereafter, the process of step S505 is performed.

(Step S505) The area specifying unit 46 classifies the calculated intersection distances into classes. Thereafter, the process of step S506 is performed. The method of classifying the intersection distances will be described later.

(Step S506) The area specifying unit 46 calculates the boundary points based on the classification result of the intersection distances in step S505. Thereafter, the process of step S507 is performed. The method of calculating the boundary points will be described later.

(Step S507) The area specifying unit 46 determines whether the processes of steps S502 to S506 are performed on all the lines from which the boundary points should be detected. When the area specifying unit 46 determines that the processes of steps S502 to S506 on all the lines from which the boundary points should be detected, the process of step S508 is performed. Otherwise, the process of step S501 is performed again.

(Step S508) The area specifying unit 46 calculates boundary lines based on the boundary points calculated in step S506. Thereafter, the process of step S509 is performed.

(Step S509) The area specifying unit 46 calculates areas included in the object based on the boundary lines calculated in step S508. Thereafter, the process of specifying the area of the object is ended.

The process of extracting the boundary points will be described with reference to an actual image example. The method of extracting the boundary points will be described depending on the types of ultraviolet rays applied to the object.

(In Case that a Laser Beam is Projected)

Figure 19:
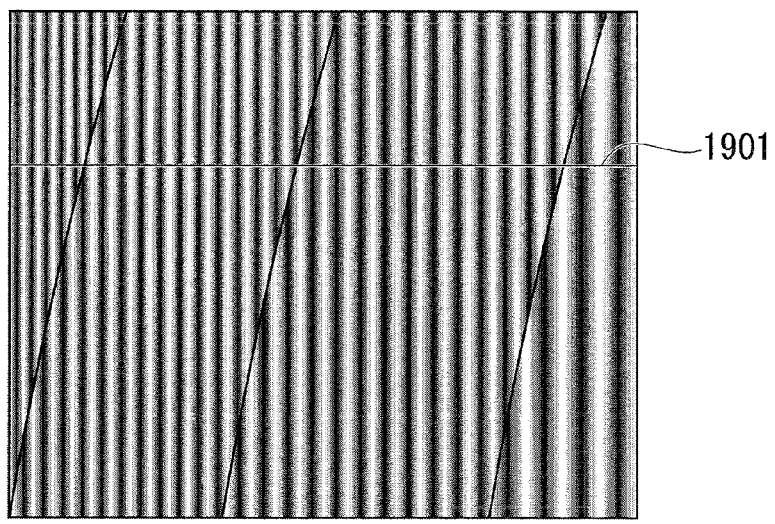
FIG. 19 is a diagram schematically illustrating a measurement image according to the first embodiment of the invention.

FIG. 19 is a diagram schematically illustrating a measurement image based on the measurement image data generated by the image generating unit 41 when a laser diode (LD) which emits a laser beam is adopted instead of the ultraviolet light LED 55 in this embodiment. A laser beam has straight directivity. Accordingly, when the laser beam is used as the ultraviolet light to be applied to the object, the stripe distance (distance between neighboring stripes of the striped pattern) of the striped pattern projected to the object is constant without depending on the distance between the ultraviolet light LED 55 and the object. The object appears smaller in an image as the distance from the imaging device 53 increases. Accordingly, the stripe distance of the striped pattern appearing in the measurement image becomes smaller as the distance from the imaging device 53 becomes greater. In the drawing, the line 1901 from which the boundary points should be detected is shown.

Figure 20:
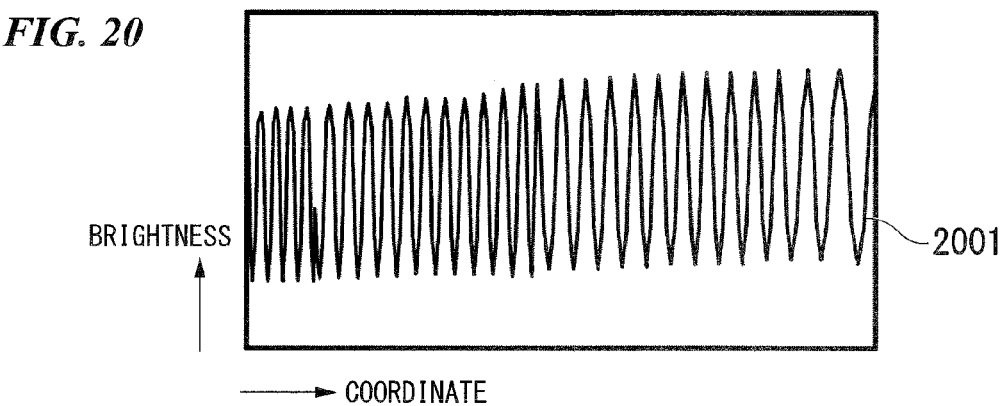
FIG. 20 is a graph illustrating a first line profile according to the first embodiment of the invention.

FIG. 20 is a graph illustrating the first line profile 2001 extracted from the measurement image shown in FIG. 19 by the area specifying unit 46 in this embodiment. The horizontal axis of the graph represents the coordinates of the line from which the boundary points should be detected. The vertical axis of the graph represents the brightness. As shown in the drawing, the first line profile 2001 is a curve corresponding to the striped distance of the measurement image shown in FIG. 19.

Figure 21:
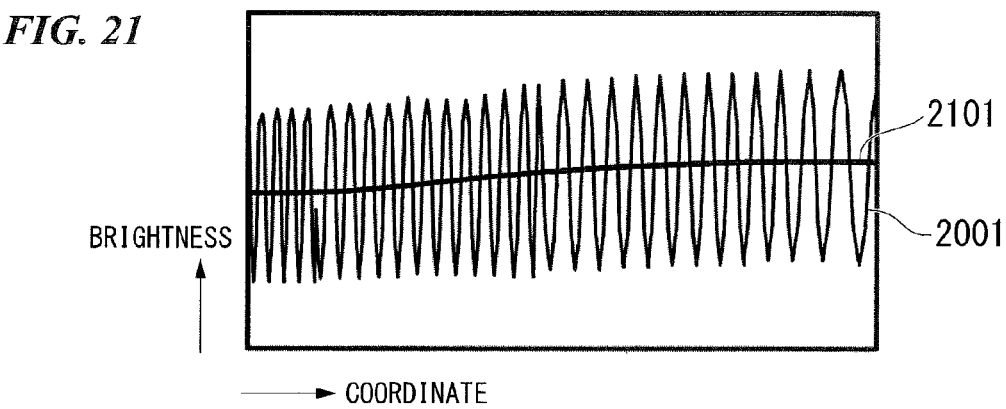
FIG. 21 is a graph illustrating a second line profile according to the first embodiment of the invention.

FIG. 21 is a diagram illustrating the second line profile 2101 generated based on the first line profile 2001 shown in FIG. 20 by the area specifying unit 46 in this embodiment. The second line profile 2101 is a curve obtained by removing the high-frequency component from the first line profile 2001.

Figure 22:
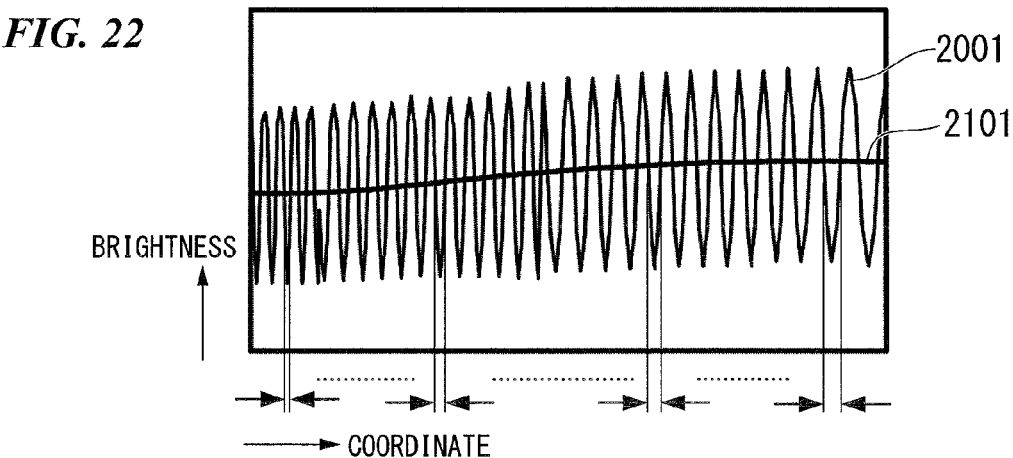
FIG. 22 is a diagram schematically illustrating distances between neighboring intersections according to the first embodiment of the invention.

FIG. 22 is a diagram schematically illustrating distances between the neighboring intersections, which are calculated by the area specifying unit 46 according to this embodiment. As shown in the drawing, the area specifying unit 46 extracts the intersections of the first line profile 2001 and the second line profile 2101, and calculates the distances between the neighboring intersections.

Figure 23:
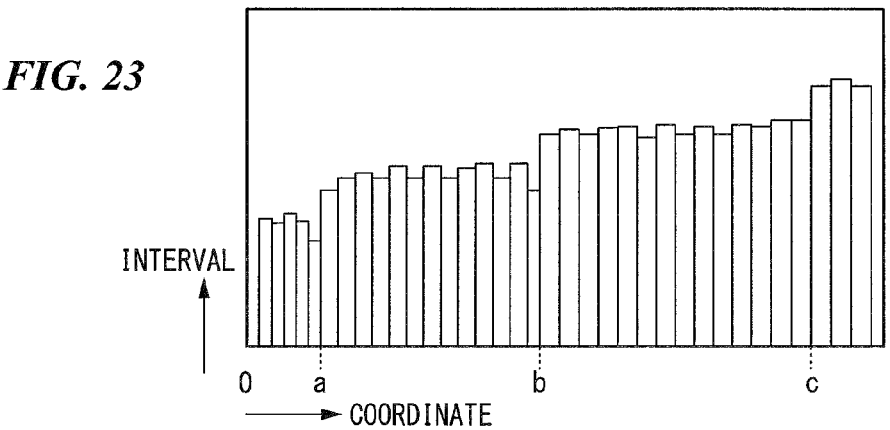
FIG. 23 is a graph illustrating the distances between neighboring intersections according to the first embodiment of the invention.

FIG. 23 is a bar graph illustrating the distances between the neighboring intersections according to this embodiment. The horizontal axis of the graph represents the coordinates in the line. The vertical axis of the graph represents the distances between the intersections. In the shown example, the left and right intersection distances of coordinate a are different from each other by a predetermined value or more. The left and right intersection distances of coordinate b are different from each other by the predetermined value or more. The left and right intersection distances of coordinate c are different from each other by the predetermined value or more. That is, at the positions of coordinates a, b, and c, the depth of the object greatly varies. Accordingly, the positions of coordinates a, b, and c are set as boundary points. The predetermined value is arbitrarily set depending on environments. The position in the horizontal axis of the bar graph represents an image coordinate at a middle point of two neighboring intersections. Therefore, the widths of the bar graph are not constant, but different.

Figure 24:
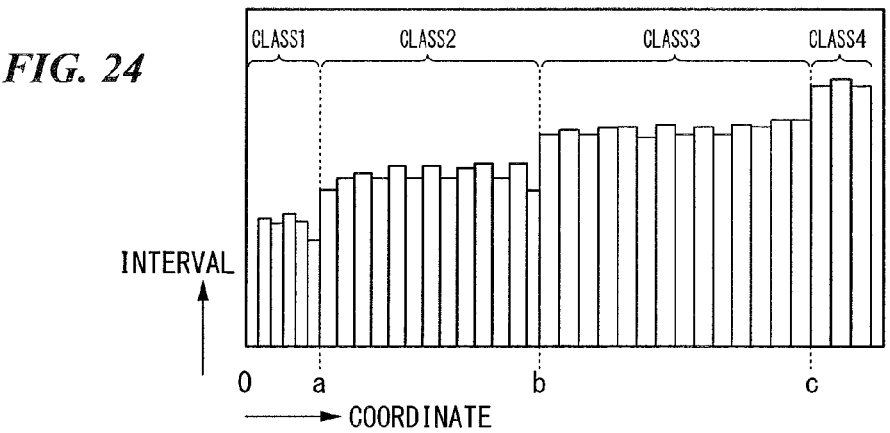
FIG. 24 is a graph illustrating classified intersection distances according to the first embodiment of the invention.

FIG. 24 is a graph illustrating the intersection distances classified in this embodiment. In this embodiment, the intersection distances are classified into classes using the boundary points. In the shown example, coordinates 0 to a are set to class 1. Coordinates a a to b are set to class 2. Coordinates b to c are set to class 3. Coordinates equal to or greater than c are set to class 4.

Figure 25:
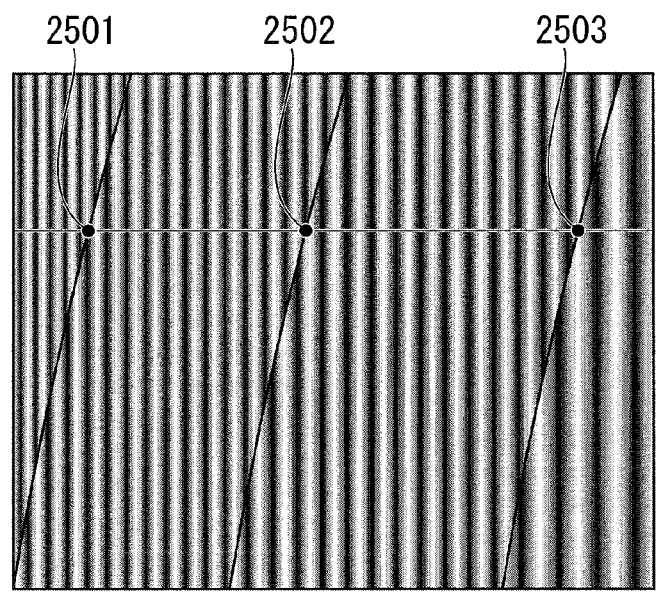
FIG. 25 is a diagram schematically illustrating boundary points marked in the measurement image data according to the first embodiment of the invention.

FIG. 25 is a diagram schematically illustrating the measurement image data generated by the image generating unit 41, in which the boundary points calculated by the area specifying unit 46 are marked, in this embodiment. As shown in the drawing, boundary points 2501 to 2503 are marked at the points at which the depths of the blades vary in the line from which the boundary points should be calculated.

When the ultraviolet light to be applied to the object is the laser beam, the boundary points are calculated as described above.

(In Case that Diffused Light is Projected)

Figure 26:
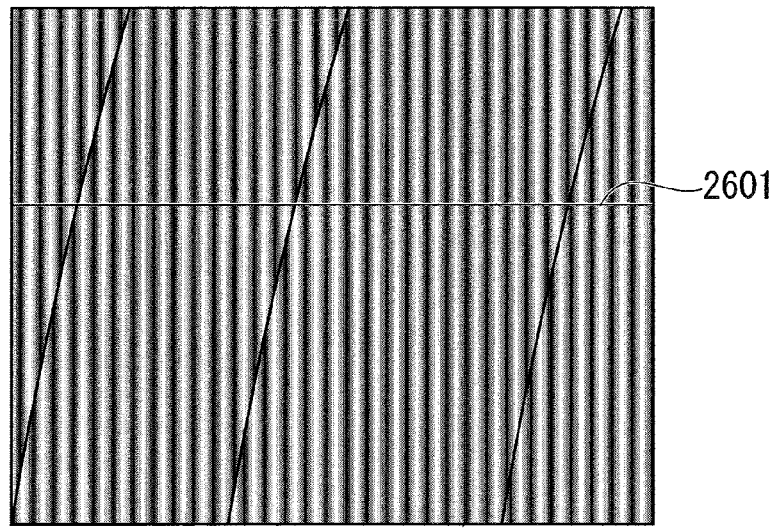
FIG. 26 is a diagram schematically illustrating a measurement image according to the first embodiment.

FIG. 26 is a diagram schematically illustrating the measurement image based on the measurement image data generated by the image generating unit 41 when the ultraviolet light LED 55 in this embodiment emits diffused light. The diffused light diffuses as the distance increases. Accordingly, when the diffused light is used as the ultraviolet light applied to the object, the stripe distance of the striped pattern projected to the object becomes greater as the distance between the object and the ultraviolet light LED 55 becomes greater. The object appears smaller in the image as the distance from the imaging device 53 becomes greater. Accordingly, the stripe distance of the striped pattern appearing in the measurement image is constant without depending on the distance from the imaging device 53. In the drawing, the line 2601 from which the boundary points should be detected is shown.

Figure 27:
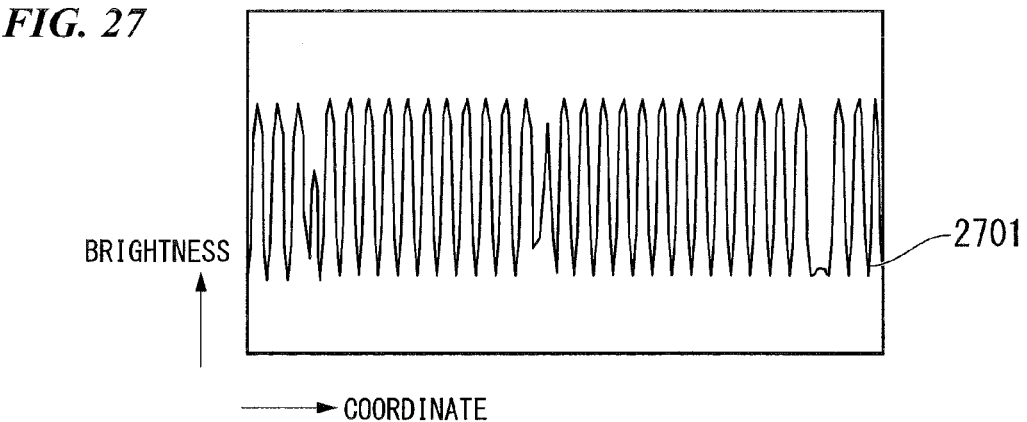
FIG. 27 is a graph illustrating a first line profile according to the first embodiment of the invention.

FIG. 27 is a graph illustrating the first line profile 2701 extracted from the measurement image shown in FIG. 26 by the area specifying unit 46 in this embodiment. The horizontal axis of the graph represents the coordinates of the line from which the boundary points should be detected. The vertical axis of the graph represents the brightness. As shown in the drawing, the first line profile 2701 is a curve corresponding to the striped distance of the measurement image shown in FIG. 26.

Figure 28:
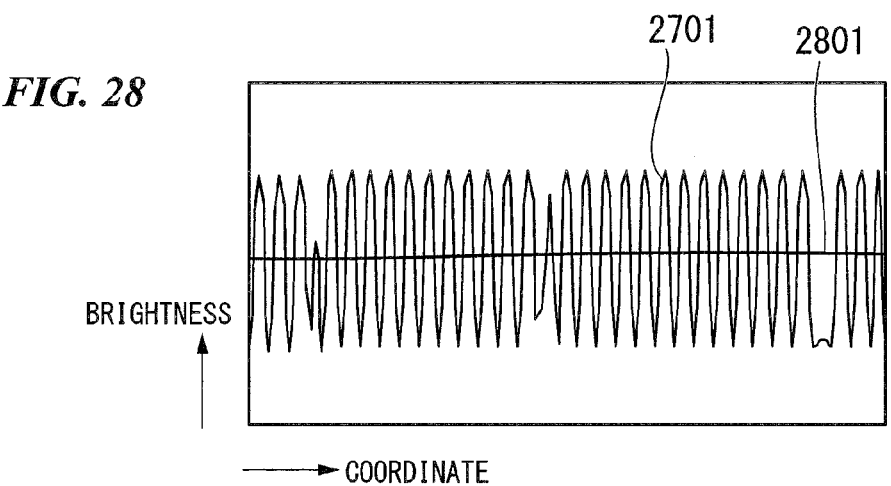
FIG. 28 is a graph illustrating a second line profile according to the first embodiment of the invention.

FIG. 28 is a diagram illustrating the second line profile 2801 generated based on the first line profile 2701 shown in FIG. 20 by the area specifying unit 46 in this embodiment. The second line profile is a curve obtained by removing the high-frequency component from the first line profile.

Figure 29:
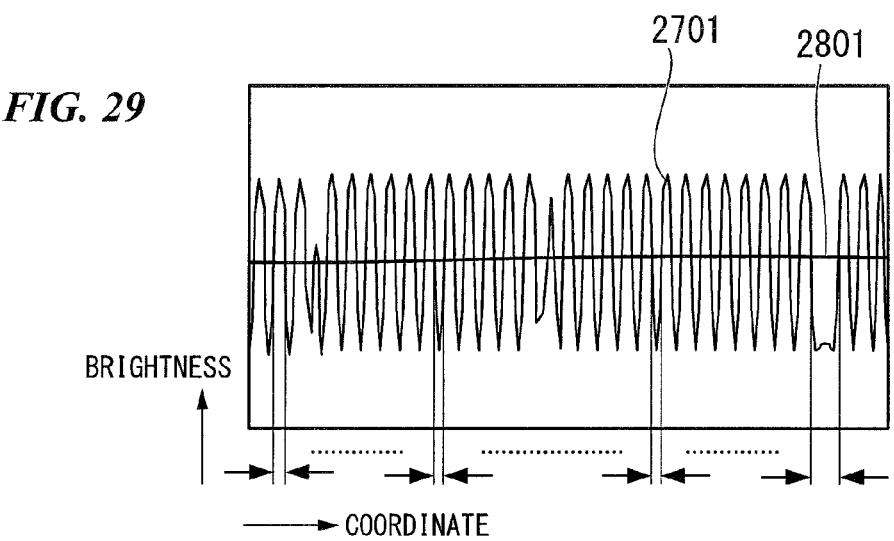
FIG. 29 is a diagram schematically illustrating the distances between neighboring intersections according to the first embodiment of the invention.

FIG. 29 is a diagram schematically illustrating the distances between the neighboring intersections, which are calculated by the area specifying unit 46 in this embodiment. As shown in the drawing, the area specifying unit 46 extracts the intersections of the first line profile and the second line profile, and calculates the distances between the neighboring intersections.

Figure 30:
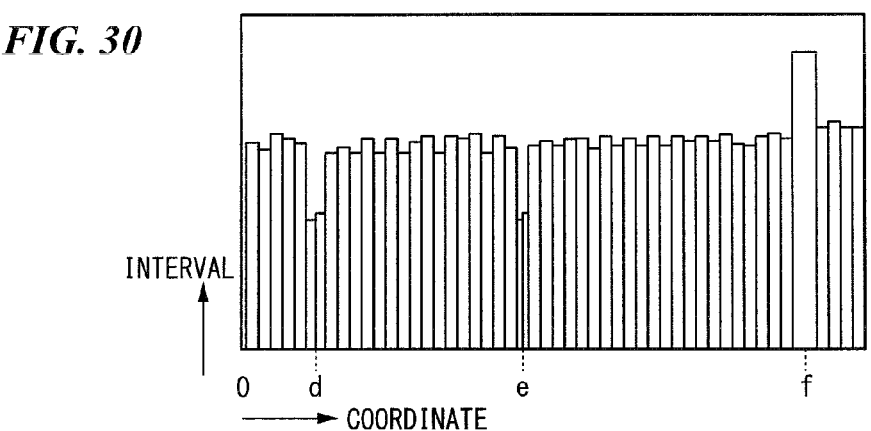
FIG. 30 is a graph illustrating the distances between neighboring intersections according to the first embodiment of the invention.

FIG. 30 is a bar graph illustrating the distances between the neighboring intersections in this embodiment. The horizontal axis of the graph represents the coordinates in the line. The vertical axis of the graph represents the distances between the intersections. In the shown example, the intersection distance of coordinate d is different from the average of all the intersection distances by a predetermined value or more. The intersection distance of coordinate e is different from the average of all the intersection distances by the predetermined value or more. The intersection distance of coordinate f is different from the average of all the intersection distances by the predetermined value or more. That is, at the positions of coordinates d, e, and f, the depth of the object greatly varies. Accordingly, the positions of coordinates d, e, and f are set as boundary points. The predetermined value is arbitrarily set depending on the environment.

Figure 31:
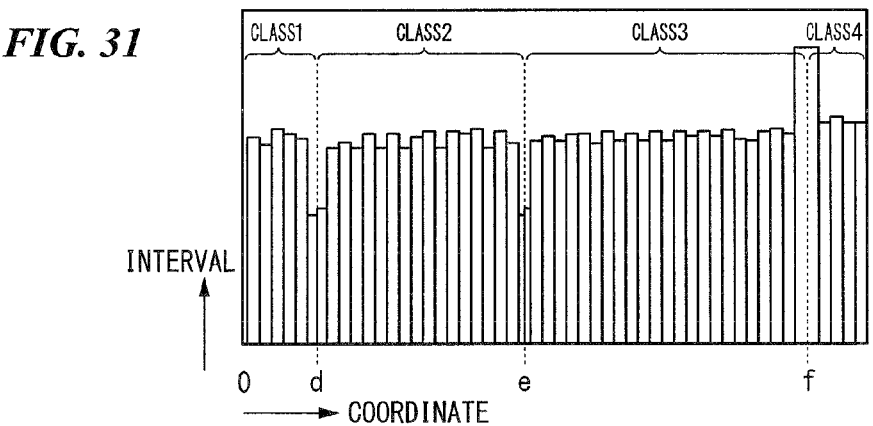
FIG. 31 is a graph illustrating classified intersection distances according to the first embodiment of the invention.

FIG. 31 is a graph illustrating the intersection distances classified in this embodiment. In this embodiment, the intersection distances are classified into classes using the boundary points. In the shown example, coordinates 0 to d are set to class 1. Coordinates d to e are set to class 2. Coordinates e to f are set to class 3. Coordinates equal to or greater than f are set to class 4.

Figure 32:
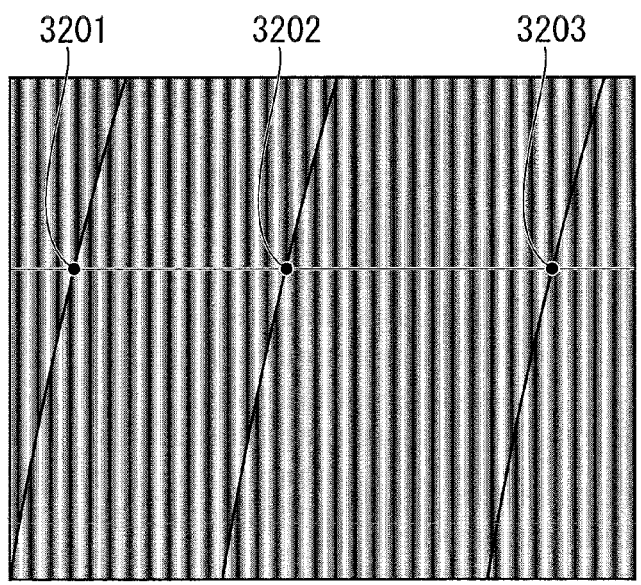
FIG. 32 is a diagram schematically illustrating boundary points marked in a measurement image according to the first embodiment of the invention.

FIG. 32 is a diagram schematically illustrating the measurement image data generated by the image generating unit 41, in which the boundary points calculated by the area specifying unit 46 are marked, in this embodiment. As shown in the drawing, boundary points 3201 to 3203 are marked at the points where the depths of the blades vary in the line from which the boundary points should be calculated.

When the ultraviolet light to be applied to the object is the diffused light, the boundary points are calculated as described above.

Figure 33:
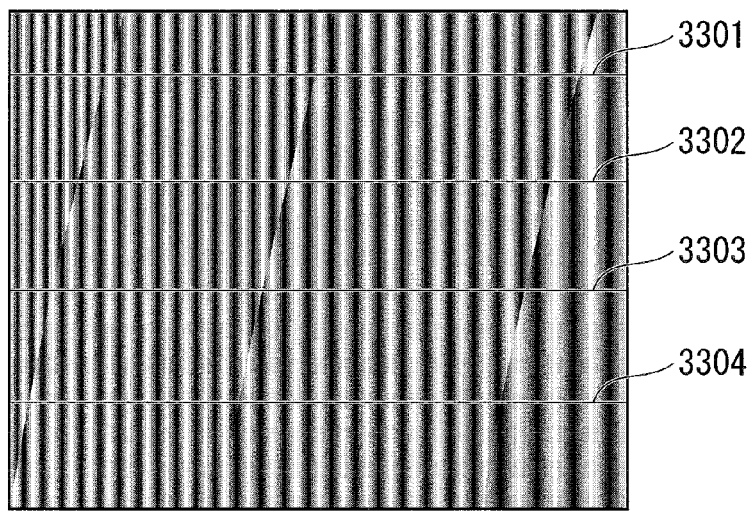
FIG. 33 is a diagram schematically illustrating lines which are marked in a measurement image and from which boundary points are calculated according to the first embodiment of the invention.

The process of specifying the area of the object will be described with reference to an actual image example. As shown in FIG. 33, the lines from which the boundary positions should be calculated are set with a predetermined distance. In the shown example, four lines 3301 to 3304 are set, but the number of lines may be increased with the smaller predetermined distance to enhance the precision for specifying the area, or the number of lines may be decreased with the greater predetermined distance to reduce the processes.

Figure 34:
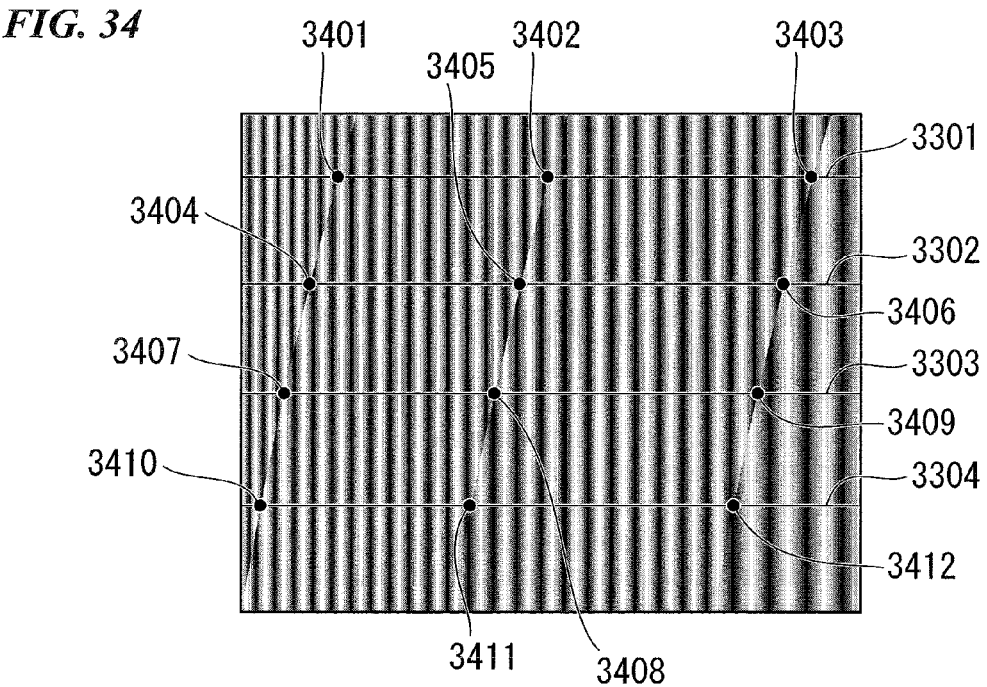
FIG. 34 is a diagram schematically illustrating boundary points marked in the measurement image according to the first embodiment of the invention.

FIG. 34 is a diagram illustrating the boundary points in the set lines. In this way, the area specifying unit 46 calculates the boundary points 3401 to 3412 in the all the set lines 3301 to 3304.

Figure 35:
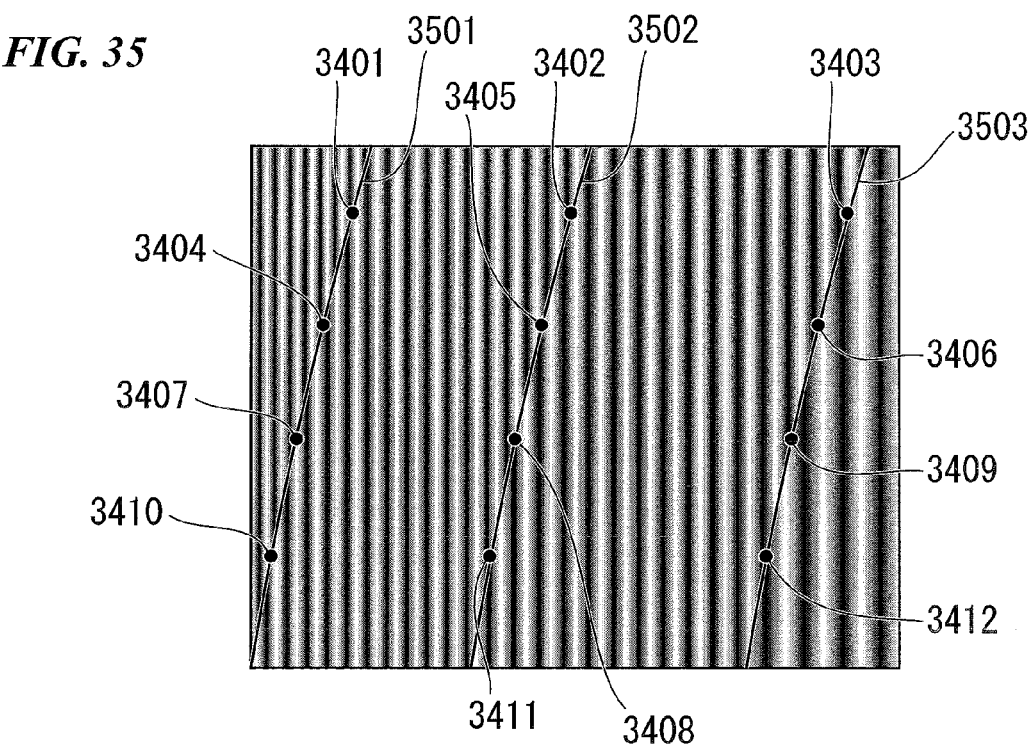
FIG. 35 is a diagram schematically illustrating boundary points and boundary lines marked in the measurement image according to the first embodiment of the invention.

FIG. 35 is a diagram illustrating boundary lines 3501 to 3503 specified based on the calculated boundary points 3401 to 3412. In this way, by connecting the boundary points 3401 to 3412 in each class, it is possible to specify the boundary lines 3501 to 3503.

Figure 36:
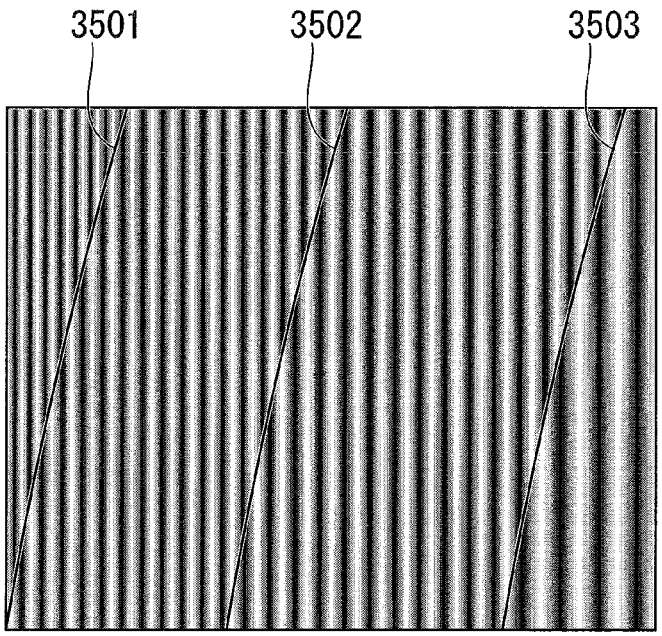
FIG. 36 is a diagram schematically illustrating boundary lines marked on the measurement image according to the first embodiment of the invention.

FIG. 36 is a diagram illustrating the specified boundary lines 3501 to 3503. In this way, the boundary lines are marked at positions at which the depths of the blades vary.

Figure 37:
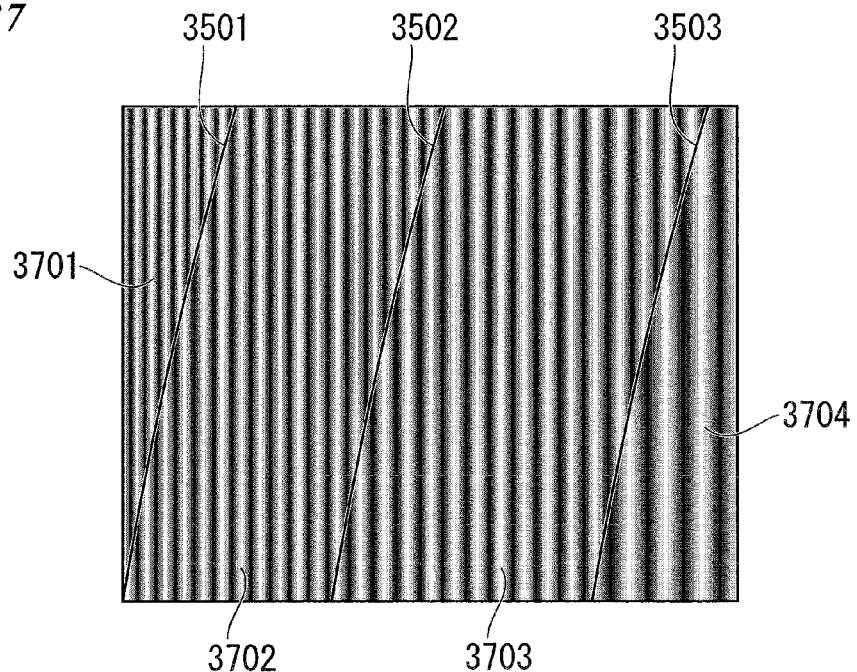
FIG. 37 is a diagram schematically illustrating marked areas according to the first embodiment of the invention.

FIG. 37 is a diagram illustrating areas 3701 to 3704. In this way, the areas surrounded with the boundary lines 3501 to 3503 are specified as the areas.

According to the above-mentioned configurations and processes, the inspection apparatus 1 can divide the area of an object using the striped pattern used to make a measurement and projected to the object. Since the area of the object is divided using the striped pattern, it is possible to precisely divide the area of even an object of which the depth is difficult to determine in appearance.

When an area is divided based on colors of an object and some colors of the object vary, the color-varying part can be determined as one area. However, in this embodiment, the area of the object is divided using the striped pattern. Accordingly, even when some colors of the object vary, it is possible to divide the area based on the depth of the object.

Since a measurement can be made for each divided area, it is possible to design an area to be measured, not a point of the measurement image or the overall measurement image, thereby efficiently performing a measurement.

Since the measurement result with low precision which can easily occur at the time of measuring the periphery of the boundary line of an object, it is possible to display the measurement result with higher accuracy and easier visibility.

(Second Embodiment)

A second embodiment of the invention will be described. An inspection apparatus 10 according to this embodiment is controlled not to make a measurement using images when an object moves or the imaging unit 20 of the inspection apparatus 10 moves while it is acquiring a plurality of measurement images.

The CPU 311 of the inspection apparatus 10 according to this embodiment serves as a main control unit 40, an image generating unit 41, a measurement area designating unit 42, a measurement processing unit 43, a graphic processing unit 44, a matching unit 45, an area specifying unit 46, and a moving object detecting unit 47.

Figure 38:
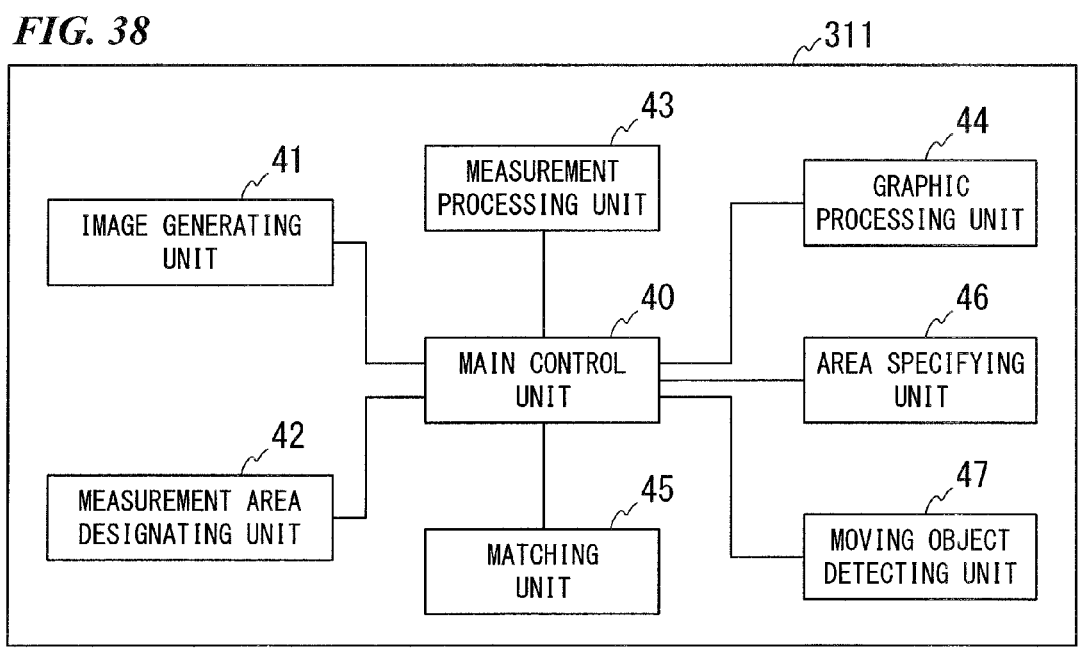
FIG. 38 is a block diagram illustrating a functional configuration of a CPU according to a second embodiment of the invention.

FIG. 38 is a block diagram illustrating the functional configuration of the CPU 311 in this embodiment. In the shown example, the CPU 311 serves as the main control unit 40, the image generating unit 41, the measurement area designating unit 42, the measurement processing unit 43, the graphic processing unit 44, the matching unit 45, the area specifying unit 46, and the moving object detecting unit 47.

The main control unit 40, the image generating unit 41, the measurement area specifying unit 42, the measurement processing unit 43, the graphic processing unit 44, the matching unit 45, and the area specifying unit 46 performs the same operations as the units in the first embodiment. The moving object detecting unit 47 detects a moving object included in the inspection image data using plural inspection image data.

The configurations of the other units of the CPU 311 of the inspection apparatus 10 according to this embodiment are the same as the configurations of the units of the inspection apparatus 1 according to the first embodiment.

The flow of operations of the inspection apparatus 10 according to this embodiment will be described. The flow of operations of the inspection apparatus 10 according to this embodiment is different from the flow of operations of the inspection apparatus 1 according to the first embodiment, in the flow of the image capturing process. The other processes performed by the inspection apparatus 10 are the same as the other processes performed by the inspection apparatus 1 according to the first embodiment.

Figure 39A:
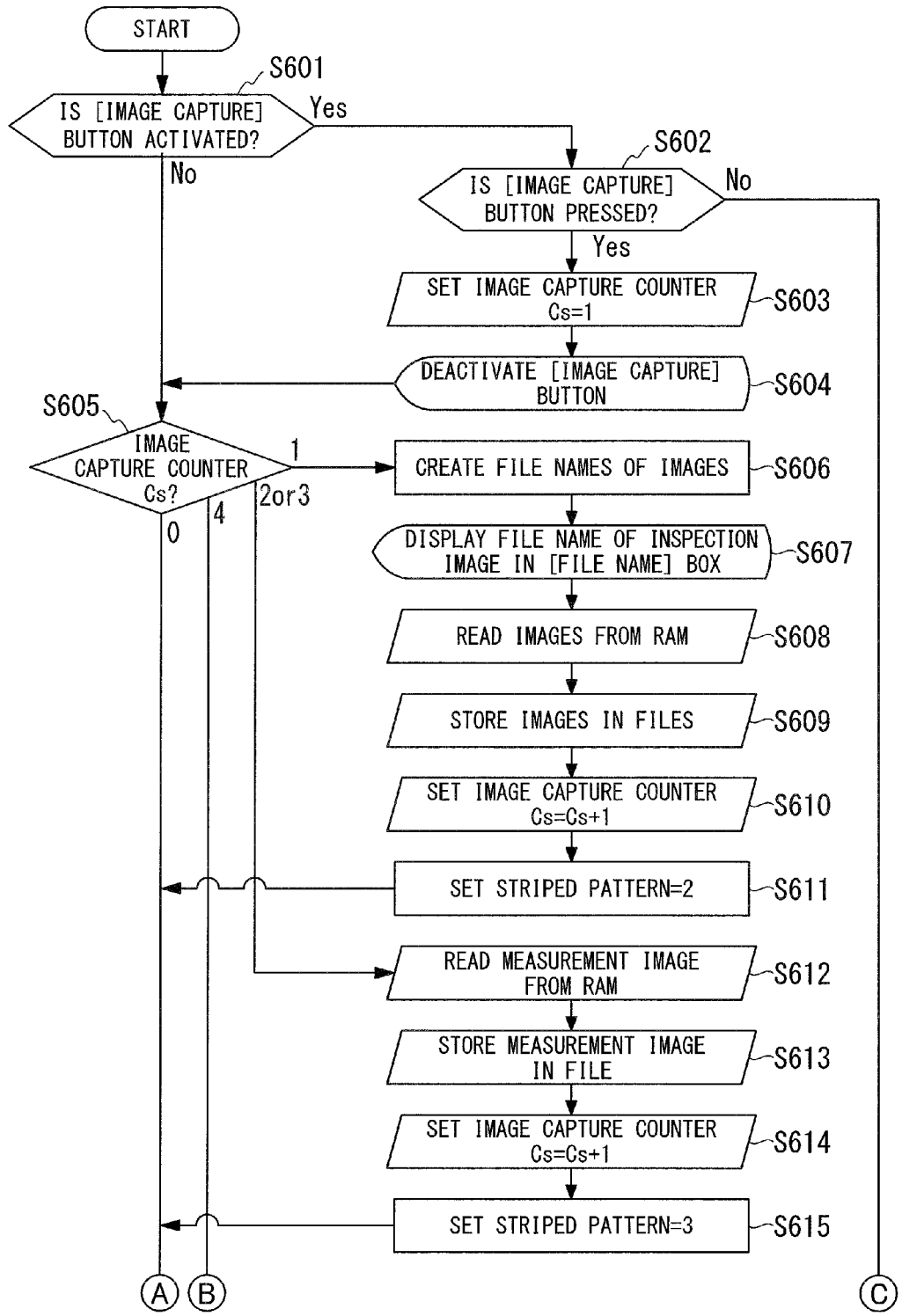
FIG. 39A is a flowchart illustrating a flow of an image capturing process according to the second embodiment of the invention.
Figure 39B:
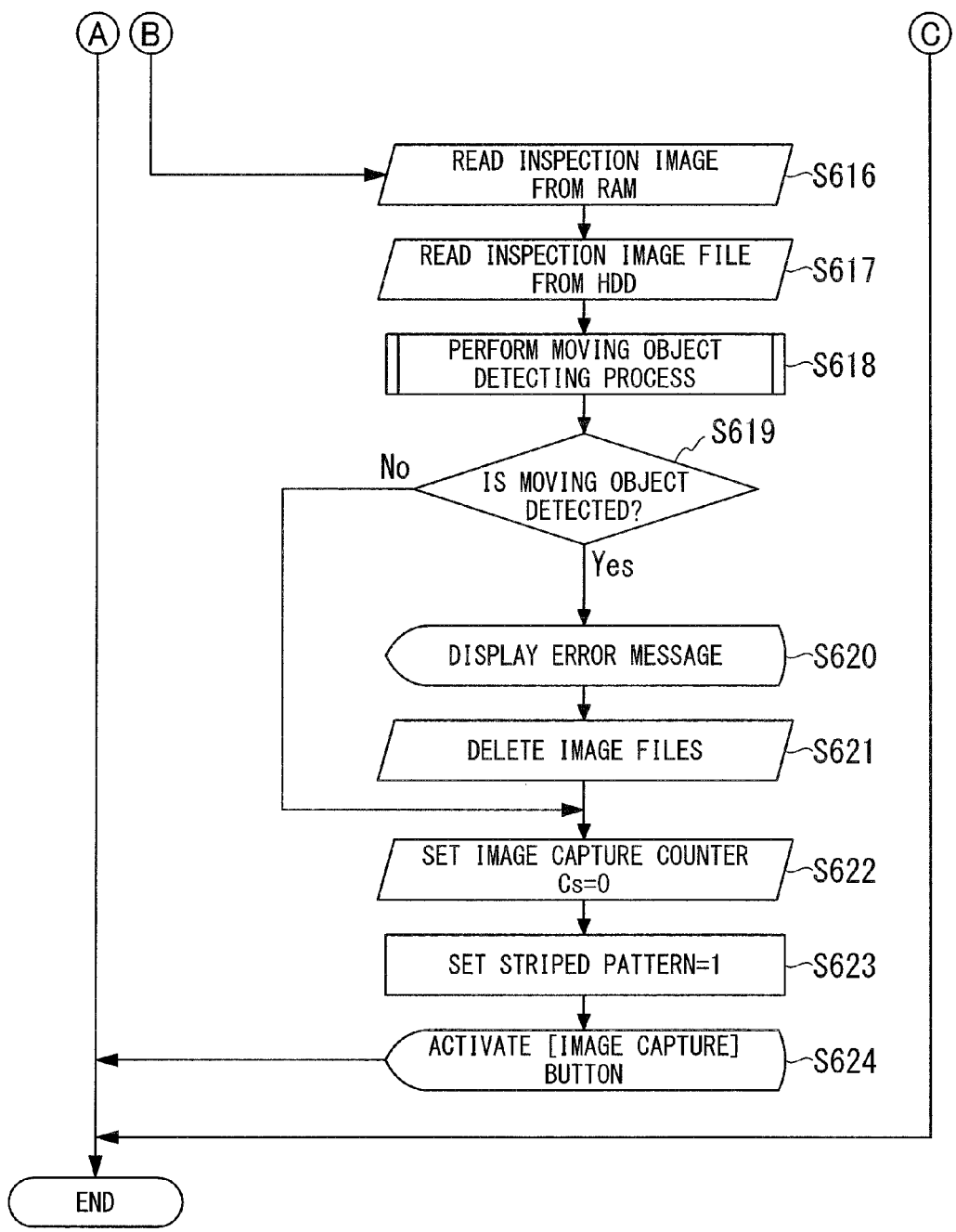
FIG. 39B is a flowchart illustrating a flow of the image capturing process according to the second embodiment of the invention.

The flow of the image capturing process in this embodiment will be described below. FIGS. 39A and 39B are flowcharts the flow of the image capturing process in this embodiment The processes of steps S601 to S604 are the same as the processes of steps S301 to S304 in the first embodiment.

(Step S605) The main control unit 40 reads the image capture counter Cs stored in the RAM 313. The main control unit 40 performs the process of step S606 when the read image capture counter Cs is "1", performs the process of step S612 when the image capture counter is "2" or "3", performs the process of step S616 when the image capture counter is "4", and ends the image capturing process when the image capture counter is "0".

The processes of steps S606 to S615 are the same as the processes of steps S306 to S315 in the first embodiment.

(Step S616) The main control unit 40 reads the inspection image data stored in the RAM 313. Thereafter, the process of step S617 is performed.

(Step S617) The main control unit 40 reads the inspection image data stored in step S609 from the hard disk 317. Thereafter, the process of step S618 is performed.

(Step S618) The moving object detecting unit 47 detects a moving object included in the inspection image data using the inspection image data read in step S616 and the image data read in step S617. Thereafter, the process of step S619 is performed. The method of detecting a moving object will be described later.

(Step S619) The moving object detecting unit 47 determines whether the moving object included in the inspection image data is detected in step S618. When the moving object detecting unit 47 determines that it detects a moving object included in the inspection image data, the process of step S620 is performed. Otherwise, the process of step S622 is performed.

(Step S620) The main control unit 40 displays an error message on the main window 100 at an interval of predetermined seconds. Thereafter, the process of step S621 is performed.

(Step S621) The main control unit 41 deletes the files of the inspection image data and the measurement image data stored in the hard disk 317 in step S609, and deletes the measurement image data stored in the hard disk 317 in step S613.

The processes of steps S622 to S624 are the same as the processes of steps S316 to S318 in the first embodiment.

A moving object detecting process will be described with reference to an actual image example.

(In Case that an Object Moved to the Left)

Figure 40:
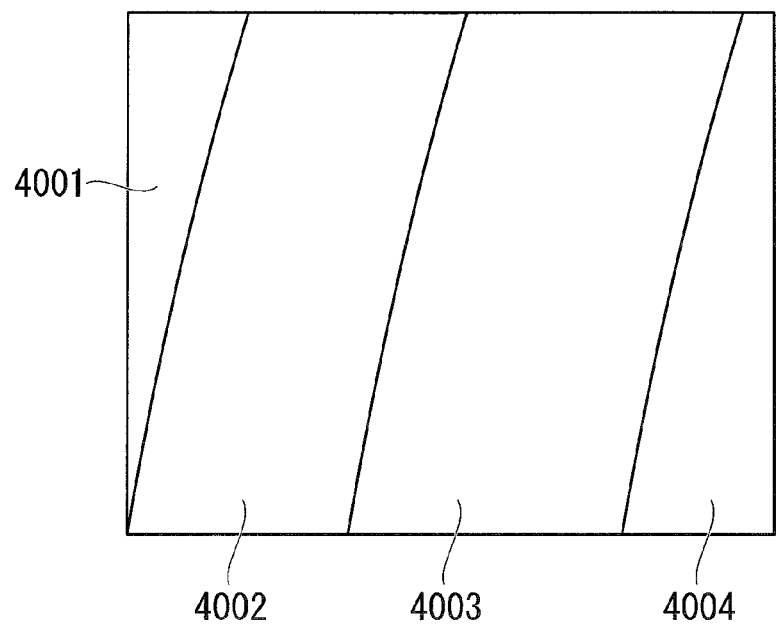
FIG. 40 is a diagram schematically illustrating an inspection image according to the second embodiment of the invention.
Figure 41:
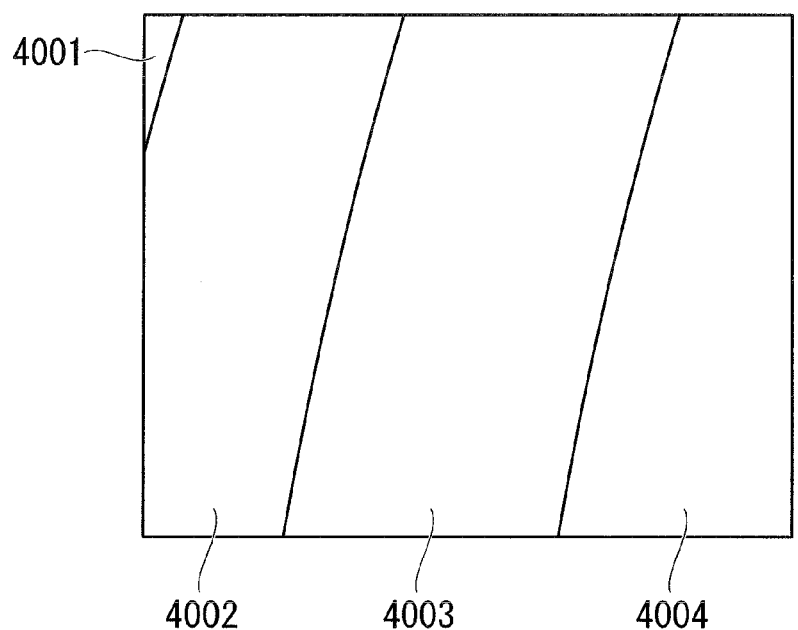
FIG. 41 is a diagram schematically illustrating an inspection image according to the second embodiment of the invention.
Figure 42:
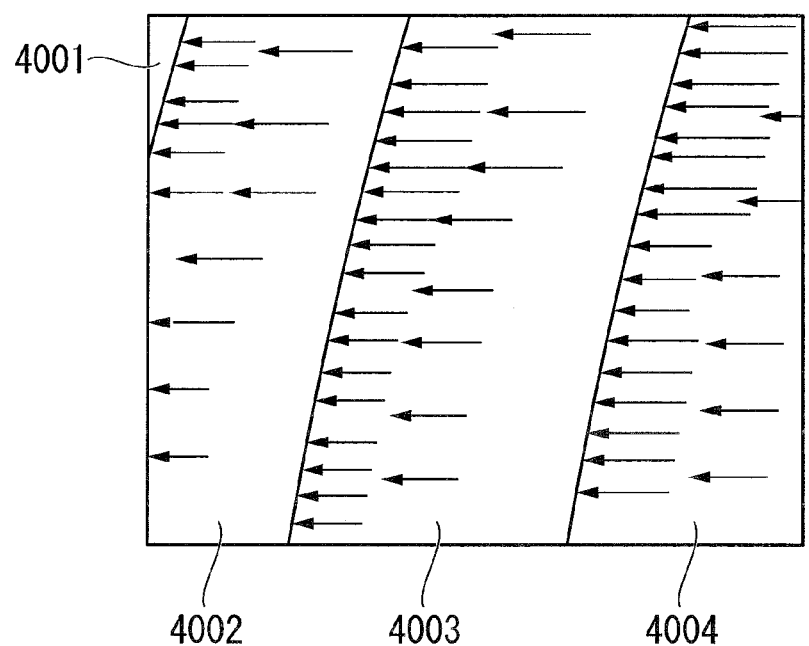
FIG. 42 is a diagram schematically illustrating an optical flow according to the second embodiment of the invention.

FIG. 40 is a diagram schematically illustrating an inspection image based on the inspection image data stored in the hard disk 317 in step S609 shown in FIG. 39A. This inspection image data is acquired at the time of starting the capturing of the measurement image data. In the drawing, blades 4001 to 4004 are shown. FIG. 41 is a diagram schematically illustrating the inspection image read from the RAM 313 in step S616 shown in FIG. 39B. This inspection image data is acquired at the time of ending the capturing of the measurement image data. In the drawing, the blades 4001 to 4004 are shown. FIG. 42 is a diagram schematically illustrating an optical flow calculated based on the inspection image data constituting the inspection image shown in FIGS. 40 and 41. In the drawing, the blades 4001 to 4004 are shown.

The blades 4001 to 4004 included in the inspection image of FIG. 41 move to the left in comparison with the blades 4001 to 4004 included in the inspection image of FIG. 40. Therefore, when the optical flow is calculated based on the inspection image data constituting the inspection images shown in FIGS. 40 and 41, a left-directed motion vector is calculated as shown in FIG. 42. The moving object detecting unit 47 detects an object having a motion vector, of which the magnitude is greater than a predetermined magnitude, as a moving object included in the inspection image data. The predetermined magnitude is set depending on the environment.

(In Case that a Distal End Portion of an Endoscope Apparatus Moved Upward)

Figure 43:
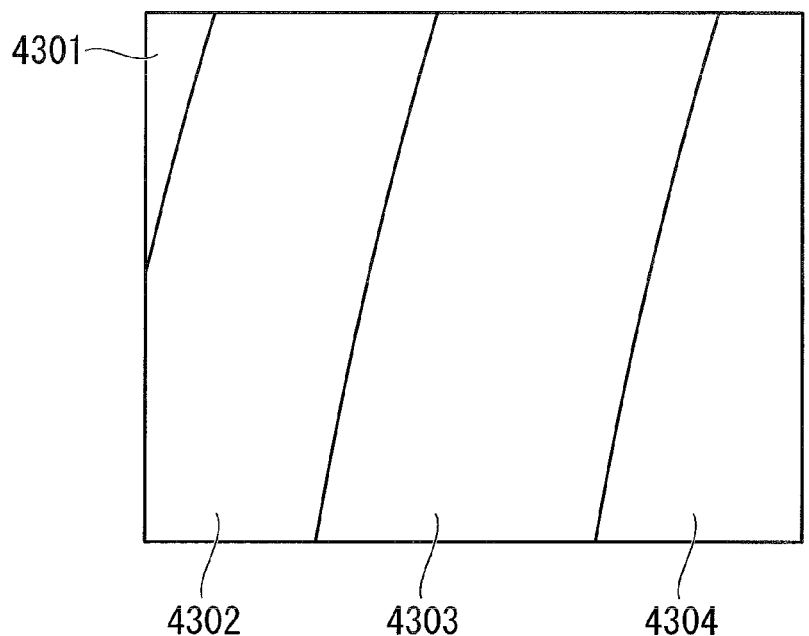
FIG. 43 is a diagram schematically illustrating an inspection image according to the second embodiment of the invention.
Figure 44:
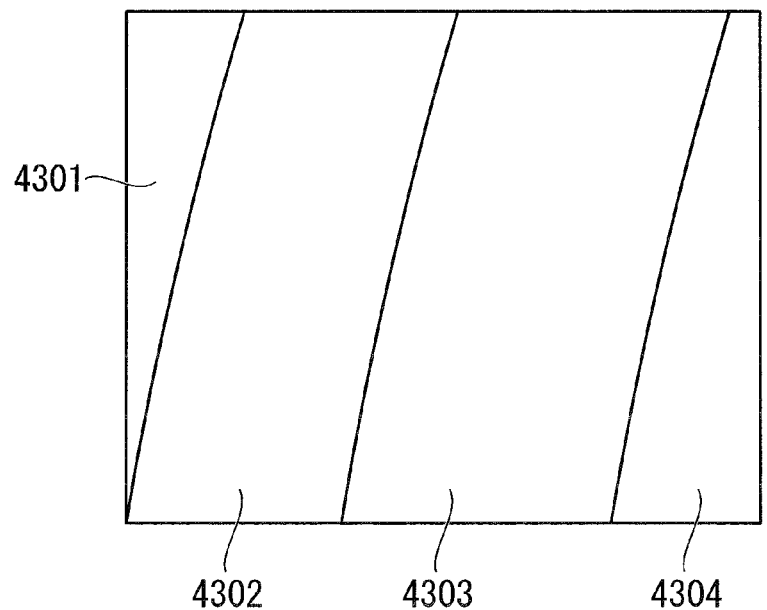
FIG. 44 is a diagram schematically illustrating an inspection image according to the second embodiment of the invention.
Figure 45:
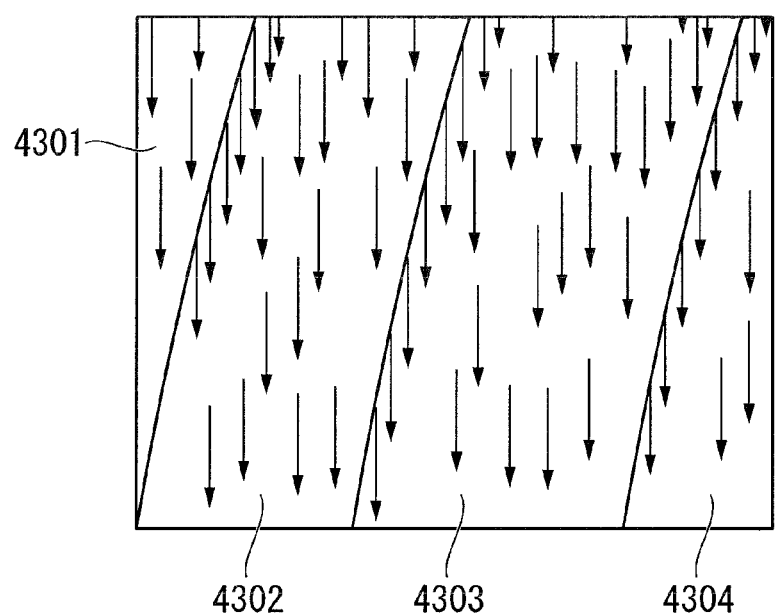
FIG. 45 is a diagram schematically illustrating an optical flow according to the second embodiment of the invention.

FIG. 43 is a diagram schematically illustrating an inspection image based on the inspection image data stored in the hard disk 317 in step S609 shown in FIG. 39A. This inspection image data is acquired at the time of starting the capturing of the measurement image data. In the drawing, blades 4301 to 4304 are shown. FIG. 44 is a diagram schematically illustrating the inspection image read from the RAM 313 in step S616 shown in FIG. 39B. This inspection image data is acquired at the time of ending the capturing of the measurement image data. In the drawing, the blades 4301 to 4304 are shown. FIG. 45 is a diagram schematically illustrating an optical flow calculated based on the inspection image data constituting the inspection image shown in FIGS. 43 and 44. In the drawing, the blades 4301 to 4304 are shown.

Since the distal end portion 20 of the inspection apparatus 10 moves upward, the blades 4301 to 4304 included in the inspection image shown in FIG. 44 move downward in comparison with the blades 4301 to 4304 included in the inspection image of FIG. 43. Therefore, when the optical flow is calculated based on the inspection image data constituting the inspection images shown in FIGS. 43 and 44, a downward-directed motion vector is calculated as shown in FIG. 45. The moving object detecting unit 47 detects an object having a motion vector, of which the magnitude is greater than a predetermined magnitude, as a moving object included in the inspection image data. The predetermined magnitude is set depending on the environment.

In this way, the moving object detecting unit 47 can calculate the optical flow using the inspection image data acquired at the time of starting the capturing of the measurement image data and the inspection image data acquired at the time of ending the capturing of the measurement image data, and detect a moving object included in the inspection image data based on the calculated optical flow.

According to the above-mentioned configurations and processes, the inspection apparatus 10 can determine whether the object or the distal end portion 20 of the inspection apparatus 10 moves while it is acquiring plural measurement image data using the inspection image captured at the time of starting and ending the acquiring of a plurality of measurement image data. Accordingly, at the time of acquiring the measurement image data, it is possible to determine whether plural measurement image data suitable for measurement are acquired.

In this embodiment, when the object or the distal end portion 20 of the inspection apparatus 10 moves while acquiring plural measurement image data, these measurement image data are deleted. Accordingly, it is possible to prevent the measurement using the measurement image data not suitable for the measurement.

In the above-mentioned example, by deleting the measurement image acquired at the time of detecting a moving object when the moving object detecting unit 47 detects the moving object, the measurement based on the image is not performed, but the invention is not limited to this configuration. For example, when the moving object detecting unit 47 detects a moving object at the time of capturing an image, the measurement processing unit 43 may be controlled so that a user cannot make a measurement using the captured measurement images.

Although exemplary embodiments of the invention have been described, the invention is not limited to the embodiments. The configurations can be added, removed, replaced, and modified without departing from the spirit and scope of the invention. The invention is not limited to the above description, but is limited only by the appended claims.

The above-mentioned processes may be performed by recording a program for performing a measurement based on images captured by the endoscope apparatus in a computer-readable recording medium and causing a computer system to read and execute the program recorded in the recording medium. Here, the "computer system" may include an OS or hardware such as peripherals.

The "computer system" may include a home page providing environment (or display environment), when it uses a WWW system.

The "computer-readable recording medium" may be a writable nonvolatile memory such as a flexible disk, a magneto-optical disk, a ROM, and a flash memory, portable mediums such as a DVD (Digital Versatile Disk), and memory devices such as a hard disk built in the computer system.

The "computer-readable recording medium" may include mediums temporarily storing programs, such as volatile memories (for example, DRAM (Dynamic Random Access Memory) in the computer system serving as a server or a client when the program is transmitted via a network such as the Internet or a communication circuit such as a telephone line.

The program may be transmitted from a computer system storing the program in its memory device via a transmission medium or via transmission waves in the transmission medium to another computer system. Here, the "transmission medium" transmitting the program means a medium having a function of transmitting information, like a network (communication network) such as the Internet or a communication circuit (communication line) such as a telephone line.

The program may implement a part of the above-mentioned functions. The program may be a program which can perform the above-mentioned functions by combination with a program previously recorded in the computer system, that is, a so-called difference file (difference program).

What is claimed is:

1. An inspection apparatus comprising:
an insertion portion which is inserted into a device under inspection;
a projection unit which projects a striped pattern including a plurality of linear patterns onto an object;
an imaging unit which is provided in the insertion portion and images the object onto which the striped pattern is projected and generates image data;
a specification unit which specifies an area of interest of the object in an image based on a position of the striped pattern in the image based on the image data; and
a measurement unit which measures the area of the object using the image data;
wherein the specification unit is configured to detect a distance between neighboring lines out of lines in the striped pattern, to detect a point in an outline of the area based on the distance, and to specify the area based on the point, and
when a comparison result of the detected distance with a reference value satisfies a predetermined condition, the specification unit detects the position, at which the distance satisfying the condition is detected, as the point.

2. The inspection apparatus according to claim 1, wherein the specification unit specifies the area based on discontinuity of the striped pattern.

3. The inspection apparatus according to claim 1, wherein the specification unit sets a value calculated from detected distances as the reference value and detects the position, at which the distance different from the reference value by a predetermined value or more is detected, as the point.

4. An inspection apparatus comprising:
an insertion portion which is inserted into a device under inspection;
a projection unit which projects a striped pattern including a plurality of linear patterns onto an object;
an imaging unit which is provided in the insertion portion and images the object onto which the striped pattern is projected and generates image data;
a specification unit which specifies an area of interest of the object in an image based on a position of the striped pattern in the image based on the image data; and
a measurement unit which measures the area of the object using the image data
wherein the specification unit is configured to detect a distance between neighboring lines out of lines in the striped pattern, to detect a point in an outline of the area based on the distance, and to specify the area based on the point, and
wherein the specification unit detects a distance between a line and a first line adjacent to the line and a distance between the line and a second line, other than the first line, neighboring to the line for each line in the striped pattern, and detects the position of the line as the point when the detected two distances are different from each other by a predetermined value or more.

5. The inspection apparatus according to claim 1, wherein the imaging unit repeatedly images the object onto which the striped pattern is projected and generates a plurality of the image data,
wherein the inspection apparatus further comprises:
an optical flow detecting unit which detects an optical flow based on the plurality of image data generated by the imaging unit;
a moving distance detecting unit which detects a moving distance of the object based on the optical flow; and
a control unit which controls a measuring operation of the measurement unit based on the moving distance of the object.

6. An inspection apparatus comprising:
an insertion portion which is inserted into a device under inspection;
a projection unit which projects a striped pattern including a plurality of linear patterns onto an object;
an imaging unit which is provided in the insertion portion and images the object onto which the striped pattern is projected and generates image data;
a specification unit which specifies an area of interest of the object in an image based on a position of the striped pattern in the image based on the image data; and
a measurement unit which measures the area of the object using the image data,
wherein the specification unit is configured to detect a distance between neighboring lines out of lines in the striped pattern, to detect a point in an outline of the area based on the distance, and to specify the area based on the point,
wherein the imaging unit repeatedly images the object onto which the striped pattern is projected and generates a plurality of the image data, wherein the inspection apparatus further comprises: an optical flow detecting unit which detects an optical flow based on the plurality of image data generated by the imaging unit; a moving distance detecting unit which detects a moving distance of the object based on the optical flow; and a control unit which controls a measuring operation of the measurement unit based on the moving distance of the object, and
wherein the control unit inhibits the measuring operation of the measurement unit when the moving distance of the object is equal to or greater than a predetermined value.

7. An inspection apparatus comprising:
- an insertion portion which is inserted into a device under inspection;
- a projection unit which projects a striped pattern including a plurality of linear patterns onto an object;
- an imaging unit which is provided in the insertion portion and images the object onto which the striped pattern is projected and generates image data;
- a specification unit which specifies an area of interest of the object in an image based on a position of the striped pattern in the image based on the image data; and
- a measurement unit which measures the area of the object using the image data,
- wherein the specification unit is configured to detect a distance between neighboring lines out of lines in the striped pattern, to detect a point in an outline of the area based on the distance, and to specify the area based on the point,
- wherein the imaging unit repeatedly images the object onto which the striped pattern is projected and generates a plurality of the image data, wherein the inspection apparatus further comprises: an optical flow detecting unit which detects an optical flow based on the plurality of image data generated by the imaging unit; a moving distance detecting unit which detects a moving distance of the object based on the optical flow; and a control unit which controls a measuring operation of the measurement unit based on the moving distance of the object, and
- wherein the control unit deletes the image data when the moving distance of the object is equal to or greater than a predetermined value.

8. The inspection apparatus according to claim 1, wherein the specification unit specifies a plurality of the areas, and
wherein the inspection apparatus further comprises a designation unit which designates the area, which is measured by the measurement unit based on an instruction input from an input device, out of the plurality of areas specified by the specification unit.

9. The inspection apparatus according to claim 8, further comprising a display unit which displays the area designated by the designation unit by emphasis.

10. A measurement method of an inspection apparatus, comprising:
- projecting a striped pattern including a plurality of linear patterns onto an object;
- imaging the object onto which the striped pattern is projected and generating image data;
- specifying an area of interest of the object in an image based on a position of the striped pattern in the image based on the image data; and
- performing a measurement of the area of the object using the image data;
- wherein the specifying comprises:
  - detecting a distance between neighboring lines out of lines in the striped pattern;
  - detecting a point in an outline of the area based on the distance; and
  - detecting the position, at which the distance satisfying the condition is detected, as the point, when a comparison result of the detected distance with a reference value satisfies a predetermined condition.

* * * * *